US010183209B1

(12) United States Patent
Orenstein et al.

(10) Patent No.: US 10,183,209 B1
(45) Date of Patent: Jan. 22, 2019

(54) STORAGE DEVICE

(71) Applicant: The Prophet Corporation, Owatonna, MN (US)

(72) Inventors: Amber Lee Orenstein, Prior Lake, MN (US); Ryan William Rasell, Apple Valley, MN (US)

(73) Assignee: THE PROPHET CORPORATION, Owatonna, MN (US)

( * ) Notice: Subject to any disclaimer, the term of this patent is extended or adjusted under 35 U.S.C. 154(b) by 0 days.

(21) Appl. No.: 15/677,566

(22) Filed: Aug. 15, 2017

Related U.S. Application Data

(60) Provisional application No. 62/536,347, filed on Jul. 24, 2017.

(51) Int. Cl.
| | | |
|---|---|---|
| *A63B 47/00* | (2006.01) | |
| *A63B 71/00* | (2006.01) | |
| *B62B 3/10* | (2006.01) | |
| *B62B 3/04* | (2006.01) | |
| *A63B 71/02* | (2006.01) | |

(52) U.S. Cl.
CPC ............ *A63B 71/0036* (2013.01); *B62B 3/04* (2013.01); *B62B 3/10* (2013.01); *A63B 71/00* (2013.01); *A63B 2071/025* (2013.01); *B62B 2202/40* (2013.01)

(58) Field of Classification Search
CPC .......... A63B 71/0036; A63B 2071/025; A63B 47/00; A63B 47/02
See application file for complete search history.

(56) References Cited

U.S. PATENT DOCUMENTS

| | | | | |
|---|---|---|---|---|
| 4,561,547 | A * | 12/1985 | Estwanik, III | ......... A47B 81/00 211/113 |
| 4,993,548 | A * | 2/1991 | Peterson | ................ A63B 47/00 206/315.1 |
| 5,113,552 | A * | 5/1992 | Payer | ...................... F16B 45/00 24/129 R |
| 5,546,639 | A | 8/1996 | Lacore et al. | |
| 5,667,082 | A * | 9/1997 | Hamilton | .................. A47F 1/08 206/315.9 |

(Continued)

OTHER PUBLICATIONS

16" Bungee Utility Suspender, Black, http://www.globalindustrial.com/p/storage/bins-totes-containers/bungee-cords-bungee-straps/16-inch-bungee-utility-suspender-black?infoParam.campaignId=T9F&gclid=CjwKCAiAoqXQBRA8EiwAllOWsujMan_lwRof6OtBsdCax-fpIMwWWxkldCaPh5zP6un3upEACSXbxoCSJoQAvD_BwE, 1 page (Accessed Jul. 17, 2017).

(Continued)

*Primary Examiner* — Brian L Swenson
(74) *Attorney, Agent, or Firm* — Merchant & Gould P.C.

(57) ABSTRACT

A storage device includes at least one set of first and second tubular members, and a plurality of elastic cords that form a penetrable barrier. A first end of each elastic cord is coupled to a first tubular member by a knot, and a second end of each elastic cord is coupled to a second tubular member by positioning an enlarged body in a keyhole. A method for assembling a storage device includes securing first and second tubular members to a frame, looping an elastic cord around the first tubular member, and inserting an enlarged body into a keyhole of the second tubular member. In alternative example, each end of the elastic cord includes an enlarged body and each end of the elastic cord is positioned in a keyhole. In another alternative example, the first tubular member is fed through the loop of each elastic cord.

17 Claims, 29 Drawing Sheets

(56) References Cited

U.S. PATENT DOCUMENTS

| | | | | |
|---|---|---|---|---|
| 5,951,075 | A | 9/1999 | Green | |
| 5,970,697 | A * | 10/1999 | Jacobs | D07B 1/185 289/1.5 |
| 6,202,263 | B1 * | 3/2001 | Harker | B62J 7/08 114/230.2 |
| 6,684,805 | B2 * | 2/2004 | Curchod | B29C 70/46 114/108 |
| 6,793,449 | B1 | 9/2004 | Simpson | B60P 7/0807 410/100 |
| 7,093,329 | B1 * | 8/2006 | Chiu | A63B 21/0552 24/300 |
| 7,204,468 | B2 * | 4/2007 | Kintzele | A47D 15/00 248/102 |
| 7,229,085 | B2 * | 6/2007 | Pederson | A63B 47/00 211/14 |
| 7,571,521 | B1 * | 8/2009 | Backman, III | B60P 7/0823 24/300 |
| 7,806,259 | B2 * | 10/2010 | Gregory | A63B 71/0036 206/315.9 |
| 8,900,074 | B1 * | 12/2014 | Johnson | A63B 69/205 473/422 |
| 2005/0050695 | A1 | 3/2005 | Mackey et al. | |
| 2011/0250979 | A1 * | 10/2011 | Dean | A63B 69/0057 473/207 |
| 2013/0276689 | A1 * | 10/2013 | Marshall | B63B 59/02 114/219 |
| 2015/0074953 | A1 * | 3/2015 | Dershem | F16L 345/00 24/301 |
| 2016/0223445 | A1 * | 8/2016 | Campbell | D07B 1/185 |

OTHER PUBLICATIONS

24" (5/16") 2 Loop Pick a Hook Bungee Cord, http://www.hookandcord.com/24-516-2-LOOP-PICK-A-HOOK-BUNGEE-CORD_p_32.html, 1 page (Accessed Jul. 17, 2017).
All-Purpose Ball Cart, http://www.ssww.com/item/all-purpose-ball-cart-W8729/, 4 pages (Copyright 2017) "Admitted as Prior Art".
Ball Storage, https://www.pinterest.com/explore/ball-storage/, 6 pages (Date Printed Nov. 10, 2017) "Admitted as Prior Art".
Bungee Cords Length Pieces, https://www.amazon.com/Bungee-Cords-Length-Pieces-Package/dp/B005ISTLSQ, 1 page (Accessed Jul. 17, 2017).
Bungee Shock Cords and Ends, http://thmarine.com/bungee-shock-cords-and-ends#!prettyPhoto, 1 page (Accessed Jul. 17, 2017).
Explore Garage Storage Systems and More, https://www.pinterest.com/pin/82472236899810794, 7 pages (Accessed Jul. 12, 2017).
Explore Playroom Organization and more!, https://www.pinterest.com/pin/217720963215016264/, 1 page (Accessed Jul. 17, 2017).
Explore Stuffed Animal Zoo, Diy Stuffed Animals, and more!, https://www.pinterest.com/pin/446489750537314259, 1 page (Accessed Jul. 17, 2017).
On Sale Stuffed Animal Storage, https://www.etsy.com/listing/385292992/on-sale-stuffed-animal-storage-stuffed, 1 page (Accessed Jul. 17, 2017).
Rubbermaid® FastTrack® Garage Vertical Ball Rack, https://www.bedbathandbeyond.com/store/product/rubbermaid-reg-fasttrack-reg-garage-vertical-ball-rack/1047151482?skuId=47151482&mcid=PS_googlepla_nonbrand_storage_online&product_id=47151482&adtype=pla&product_channel=online&adpos=1o2&creative=43742658229&device=c&matchtype=&network=g&gclid=Cj0KEQjwy4zLBRCOg6-4h6vs3cUBEiQAN-yzfn9FWzMTBlkWgCC8a8r8LZqya7RgXUhrO8mLccpy9OYaApI98P8HAQ, 4 pages (Copyright 2017) "Admitted as Prior Art".
Spherical Golf Ball Style Elastic Bungee Shock Cord Rope Ends for 3-5mm Cord, https://www.ebay.co.uk/itm/Spherical-Golf-Ball-Style-Elastic-Bungee-Shock-Cord-Rope-Ends-For-3-5mm-Cord-/252399888969, 1 page (Accesses Jul. 17, 2017).
Tekton 6261 10-Inch Ball Anchor Tarp Bungee Cord, 12-Piece, https://www.amazon.com/TEKTON-6261-10-Inch-Anchor-12-Piece/dp/B00AHV3DMO, 1 page (Accessed Jul. 17, 2017).
Tekton 6263 Adjustable Ball Anchor/Hook Tarp Bungee Cord, 12-Piece, https://www.amazon.com/TEKTON-6263-Adjustable-Anchor-12-Piece/dp/B00AHV3E8W, 1 page (Accessed Jul. 17, 2017).
The Perfect Bungee, Bungee Cord,6YXW3, https://www.grainger.com/product/THE-PERFECT-BUNGEE-Bungee-Cord-6YXW3, 1 page (Accessed Jul. 17, 2017).
The Perfect Bungee PC30LEP, Bungee Cord, Hook and Loop, 30" L, Pink, https://guide.alibaba.com/shop/the-perfect-bungee-pc30lep-bungee-cord-hook-and-loop-30-l-pink_32457466.html, 1 page (Accessed Jul. 17, 2017).
W8729—All Purpose Equipment Cart™ Assembly Instructions, S&S Worldwide, 2 pages (Accessed Jul. 12, 2017).

* cited by examiner

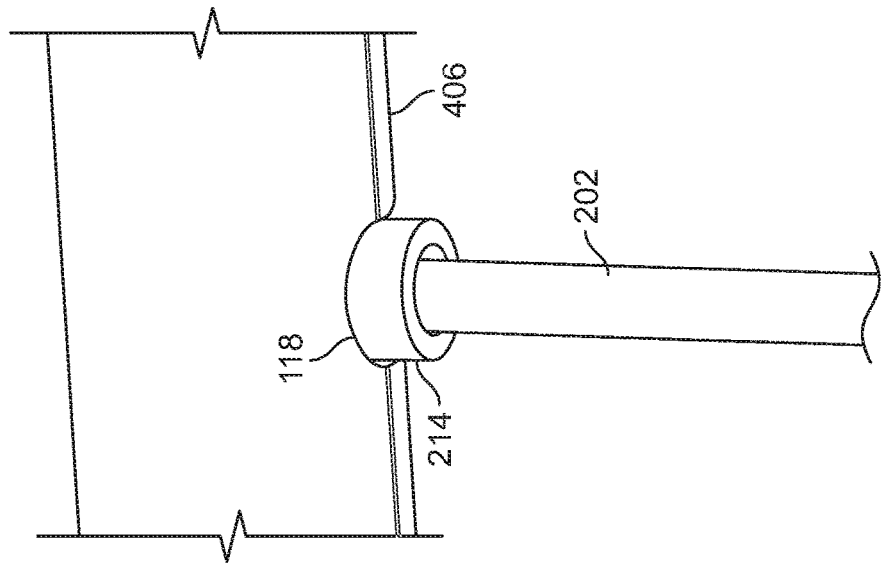
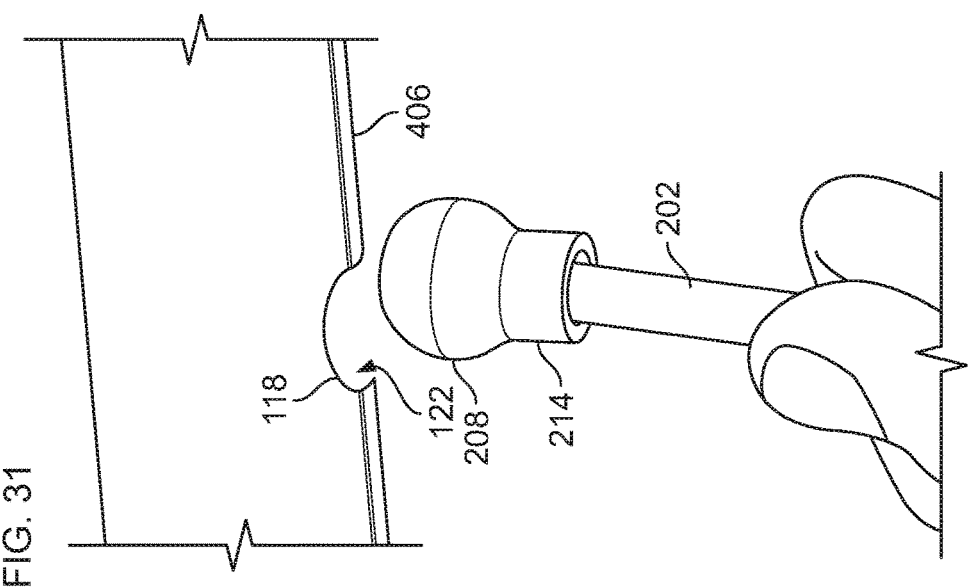

STORAGE DEVICE

CROSS REFERENCE TO RELATED APPLICATION

This application claims the benefit of provisional application Ser. No. 62/536,347, filed Jul. 24, 2017, which is incorporated herein by reference in its entirety.

BACKGROUND

When equipment such as sports balls, cones, gloves, helmets etc. are stored in a storage bin, it can be difficult to retrieve a particular item that is at the bottom of a pile in the bin. Also, the assembly of a storage bin for holding such items can be cumbersome, especially when the bin includes multiple rails attached to a frame.

SUMMARY

The present disclosure relates generally to a storage device.

In one aspect, the disclosed technology relates to a storage device including at least one set of first and second tubular members. The second tubular member includes a series of keyholes. A plurality of elastic cords each include a loop on a first end and an enlarged body on a second end, and the enlarged body includes a neck. The first end of each elastic cord is coupled to the first tubular member by a knot formed by the enlarged body positioned through the loop of the elastic cord, and the enlarged body of each elastic cord is positioned in a keyhole of the second tubular member. The plurality of elastic cords form a penetrable barrier. In one embodiment, the storage device includes more than one set of first and second tubular members such that the storage device comprises more than one penetrable barrier. In another embodiment, the storage device includes at least one cross bar coupled to the first tubular member at a bottom of the storage device. In one embodiment, each keyhole comprises an enlarged opening having a channel continuous therewith, and the enlarged opening of each keyhole is configured to receive the enlarged body of each elastic cord, and the channel is configured to prevent the enlarged body from passing through. In one embodiment, the neck of the enlarged body engages the channel of the keyhole. In one example, the width of the channel is about 67% to about 70% the width of the enlarged opening. In another example, the width of the enlarged body is about 94% to about 96% the width of the enlarged opening and about 136%-140% the width of the channel. In one embodiment, the first and second tubular members are mounted to a frame. In one embodiment, the storage device includes wheels. In another embodiment, the first and second tubular members are mounted to a wall.

In another aspect, the disclosed technology relates to an elastic cord including an elastic body having a single length and first and second ends, an enlarged body having a neck coupled to the first end, and a loop on the second end. In one example, the elastic body has a length of about 18 to 44 inches. In one embodiment, the neck is a protective barrier for the elastic body. In one example, the elastic cord is made from a rubber material.

In another aspect, the disclosed technology relates to a storage device including at least one pair of first and second tubular members, each tubular member including a plurality of keyholes, and a plurality of elastic cords, each elastic cord including a first enlarged body on one end, and a second enlarged body on an opposite end, wherein the first enlarged body of each elastic cord is positioned in a keyhole in the first tubular member, and the second enlarged body of each elastic cord is positioned in a keyhole in the second tubular member, and wherein the plurality of elastic cords form a penetrable barrier. In one embodiment, the first and second enlarged bodies each comprise a neck for protecting an elastic body of each elastic cord.

In another aspect, the disclosed technology relates to a method for assembling a storage device, including the steps of providing first and second spaced tubular members, securing the first and second tubular members to a frame, looping an elastic cord around a first tubular member by passing an enlarged body coupled to one end of the elastic cord through a loop formed on an opposite end of the elastic cord, inserting the enlarged body into a keyhole of the second tubular member, and repeating the previous two steps so that a plurality of elastic cords form a penetrable barrier between the first and second tubular members. In one embodiment, the frame is a wall. In another embodiment, the frame is part of a bin.

In another aspect, the disclosed technology relates to a method for assembling a storage device, including the steps of providing first and second spaced tubular members, securing the first and second tubular members to a frame, feeding a loop formed on one end of an elastic cord through the first tubular member, inserting an enlarged body formed on an opposite end of the elastic cord into a keyhole of the second tubular member, and repeating the previous two steps so that a plurality of elastic cords form a penetrable barrier between the first and second tubular members. In one embodiment, the frame is a wall. In another example, the frame is part of a bin.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 31 is a view of an enlarged body of an elastic loop positioned next to a keyhole.

FIG. 32 is a view of an enlarged body of an elastic loop positioned inside a keyhole.

DETAILED DESCRIPTION

Figure 1:
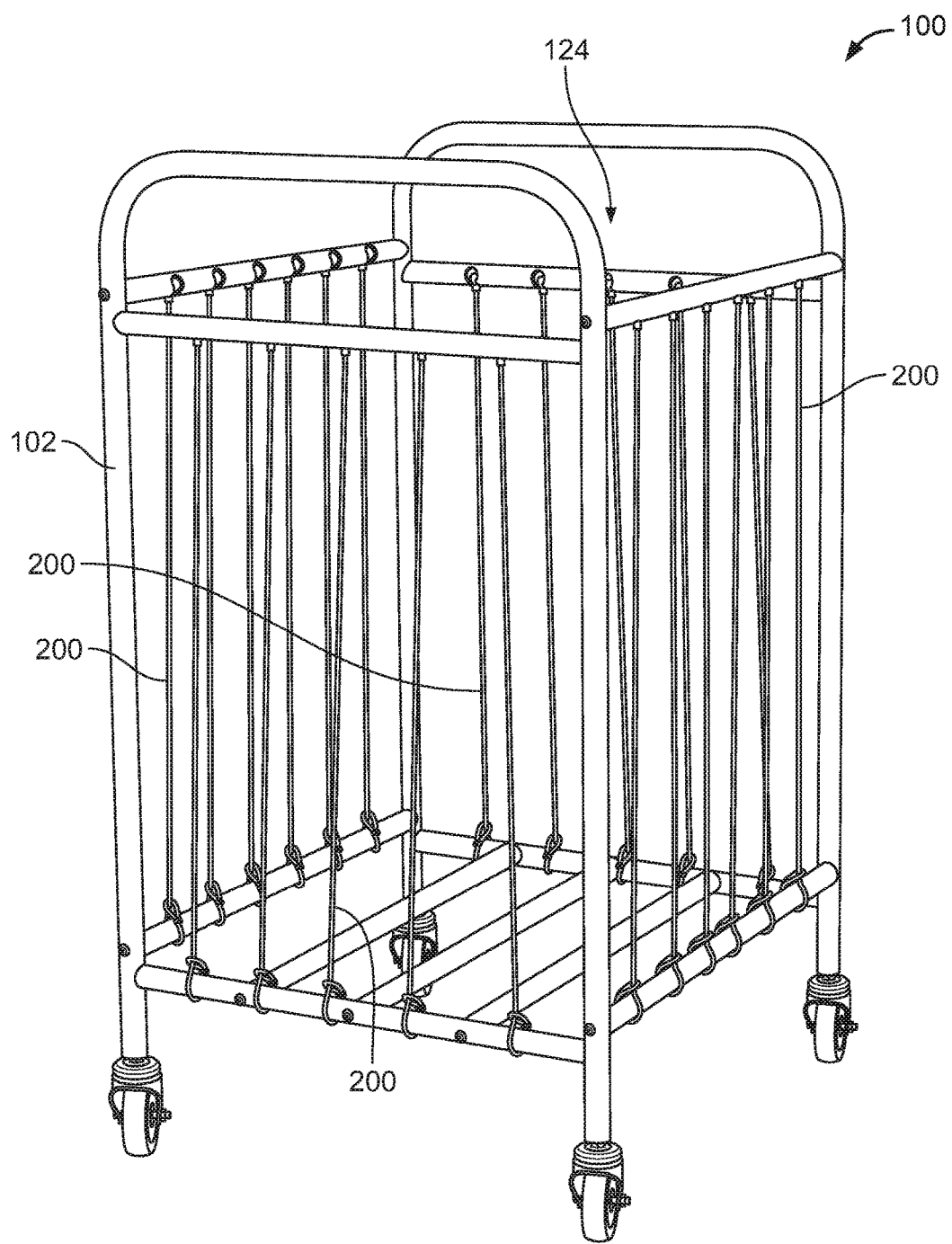
FIG. 1 is a perspective view of a first embodiment of an assembled storage device.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a perspective view of a first embodiment of an assembled storage device 100. The storage device 100 includes a frame 102 and a plurality of elastic cords 200 that stretch along each side of the frame 102. When coupled to the frame 102, the plurality of elastic cords 200 create a penetrable barrier on each side of the storage device 100 so that objects can be kept within a storage area 124 defined in the storage device 100. A user can stretch a pair of elastic cords 200 to pull an item through a penetrable barrier formed by the elastic cords 200. In this manner, an item can be pulled through a side of the storage device 100.

Figure 2:
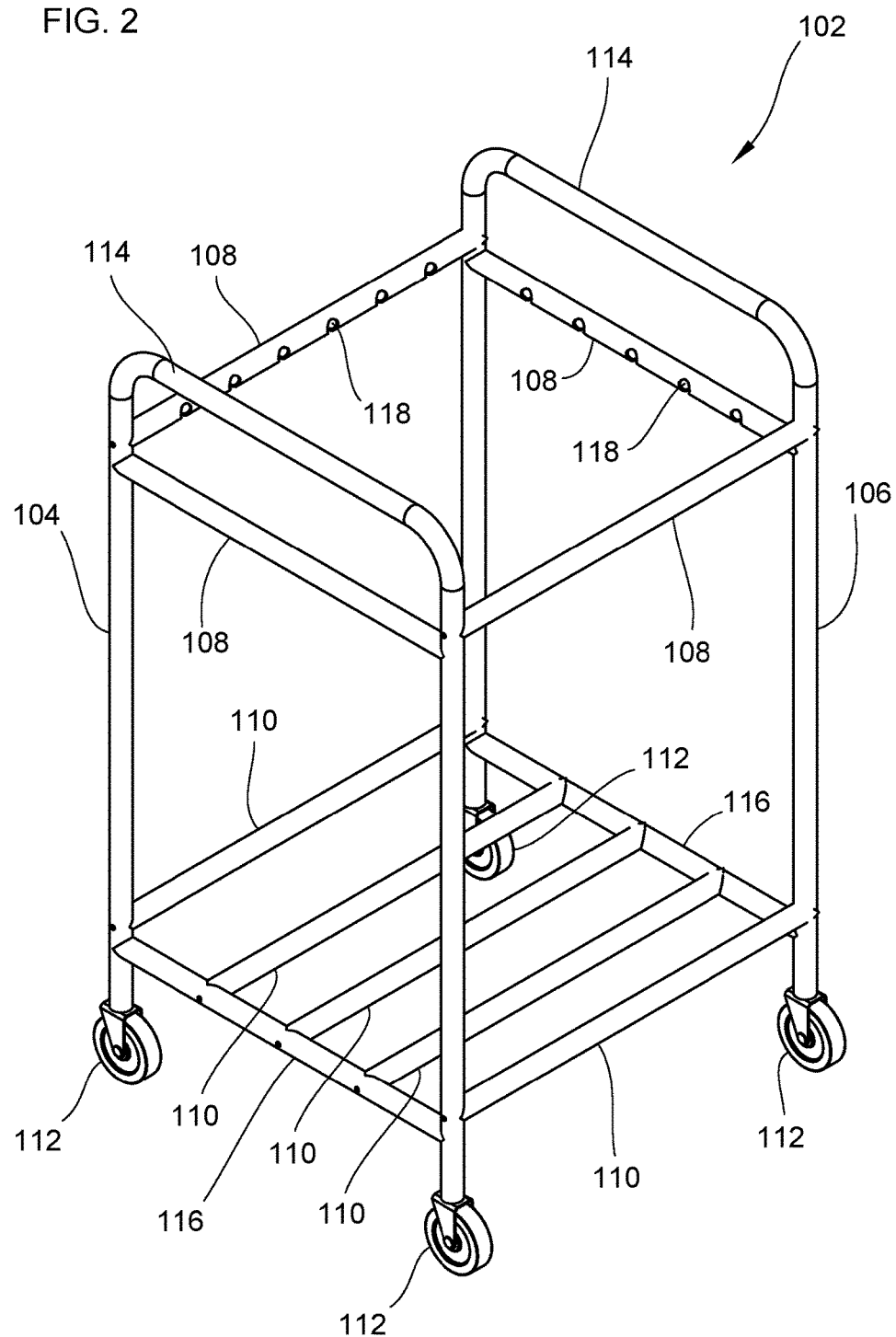
FIG. 2 is a top perspective view of a frame of the storage device in the first embodiment.
Figure 2A:
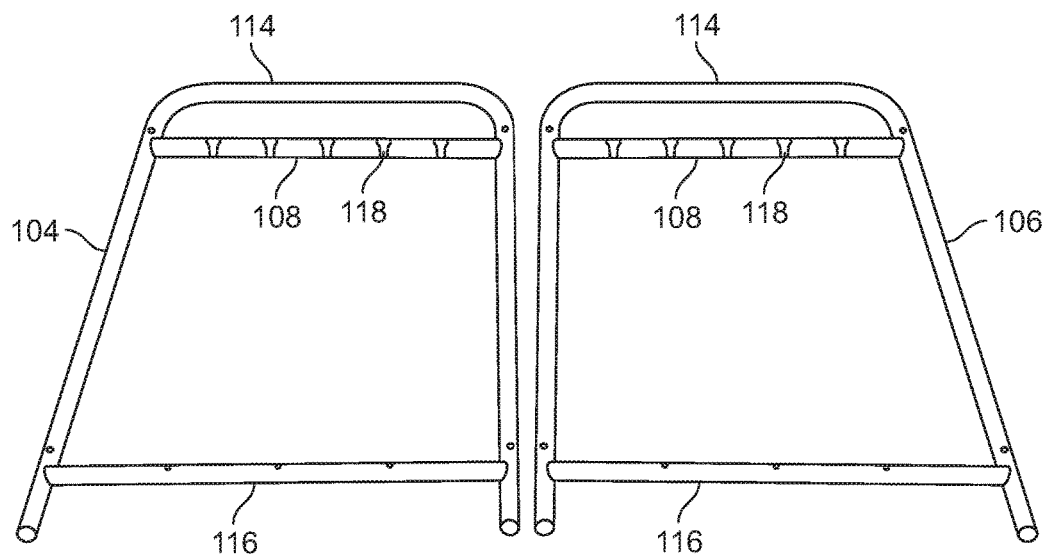
FIG. 2A is a view of first and second side frames separated from the frame.

FIG. 2 is a top perspective view of the frame 102 of the storage device 100 in the first embodiment. The frame 102 includes first and second side frames 104, 106. A view of the first and second side frames 104, 106 separate from the frame 102 is shown in FIG. 2A. A key-holed cross bar 108 and a fixed bar 116 are couple to each side of a side frame 104, 106. Each key-holed cross bar 108 includes a series of keyholes 118. Optionally, wheels 112 may be coupled to the bottoms of each side frame 104, 106, and handle bars 106 may be coupled to the top of each side frame 104, 106. The wheels 112 can assist moving the storage device 100 across a floor area such as, for example, a gymnasium floor.

The first and second side frames 104, 106 are coupled together by a pair of key-holed cross bars 108 and a pair of cross bars 110. Additional cross bars 110 are coupled between the fixed bars 116 of the first and second side frames 104, 106 for preventing items from passing through the bottom of the storage device 100. The key-holed cross bars 108 and the cross bars 110 may be coupled to the frame 102 using conventional fasteners such as bolts, screws, etc. The key-holed cross bars 108, the cross bars 110, and the fixed bars 116 are each tubular members. As defined herein, a tubular member may be of any cross-sectional shape and may take any profile shape. For example, in some embodiments tubular members such as the key-holed cross bars 108, the cross bars 110, and the fixed bars 116 may have a curved or bent shape, and may even have the shape of a circular or elliptical rim. Thus, it is contemplated that in at least some embodiments the key-holed cross bars 108, the cross bars 110, and the fixed bars 116 are not straight bars.

Figure 3:
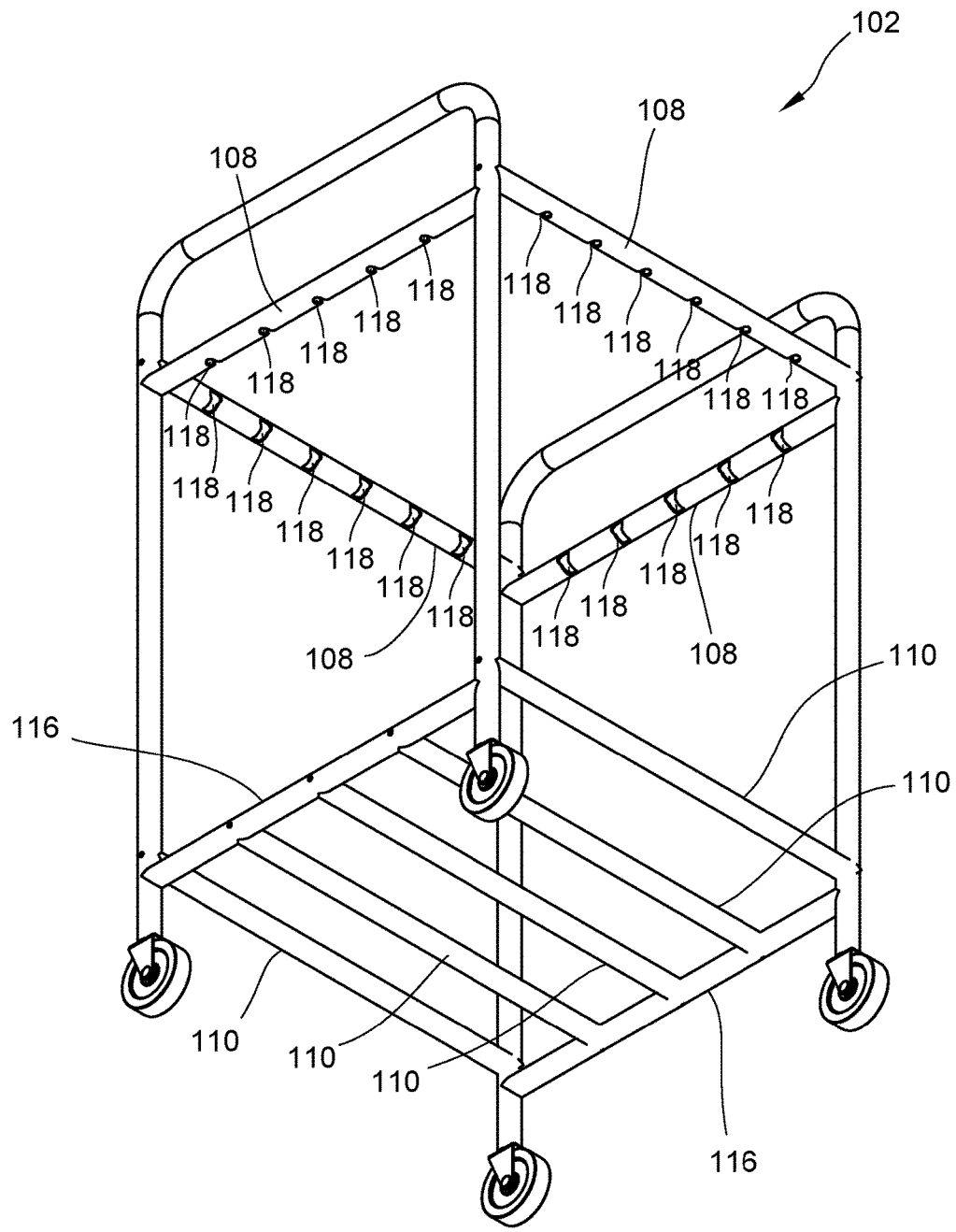
FIG. 3 is a bottom perspective view of the frame in the first embodiment.
Figure 3A:
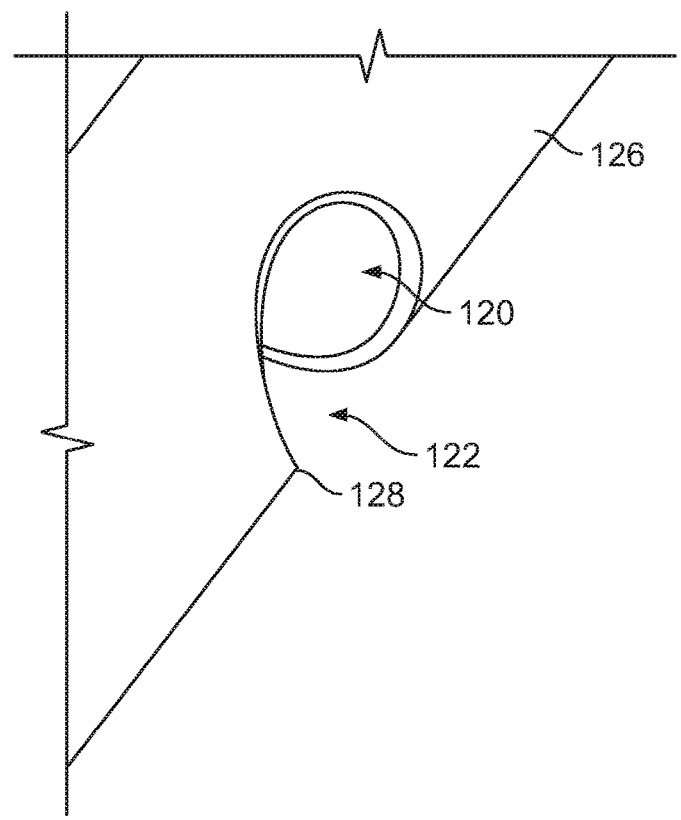
FIG. 3A is an enlarged view of a keyhole.

FIG. 3 depicts a bottom perspective view of the frame 102. Each of the key-holed cross bars 108 includes a series of keyholes 118 running along their respective lengths. The number of keyholes 118 disposed in each key-holed cross bar 108 may vary as required or desired for a particular application. FIG. 3A depicts an enlarged view of a keyhole 118 disposed in the key-holed cross bars 108. Each keyhole 118 comprises an enlarged opening 120 and a channel 122. The enlarged opening 120 is disposed on a first surface 126 of the key-holed cross bars 108 which faces an opposite key-holed cross bars 108 in the frame 102. The channel 122 is disposed on a second surface 128 of the key-holed cross bars 108 which faces an opposite cross bar 110 in the frame 102. The width of the channel 122 is less than the width of the enlarged opening 120. As will be explained in greater detail below, the enlarged opening 120 facilitates the insertion of an enlarged body 208 of an elastic cord 200 into the keyhole 118. In some examples, the width of the channel 122 may be about 67% to about 70% the width of the enlarged opening 120.

Figure 4:
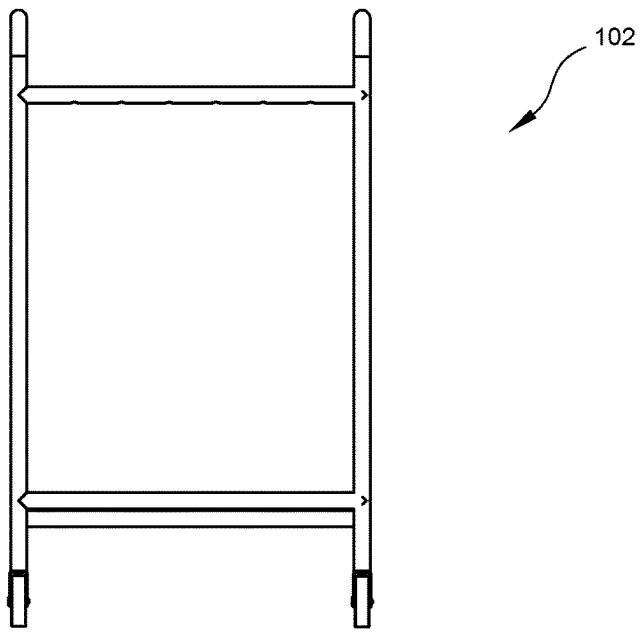
FIG. 4 is a side view of the frame of the storage device in the first embodiment.
Figure 5:
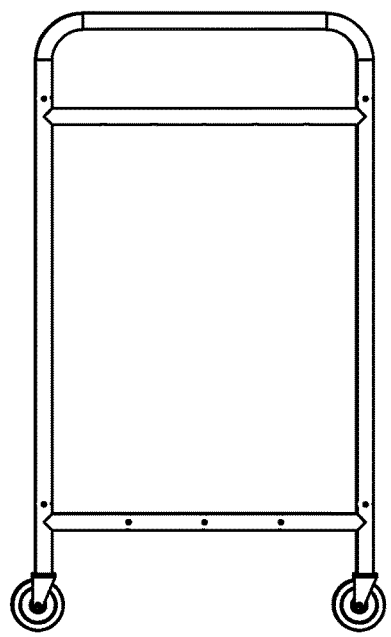
FIG. 5 is a front view of the frame of the storage device in the first embodiment.
Figure 6:
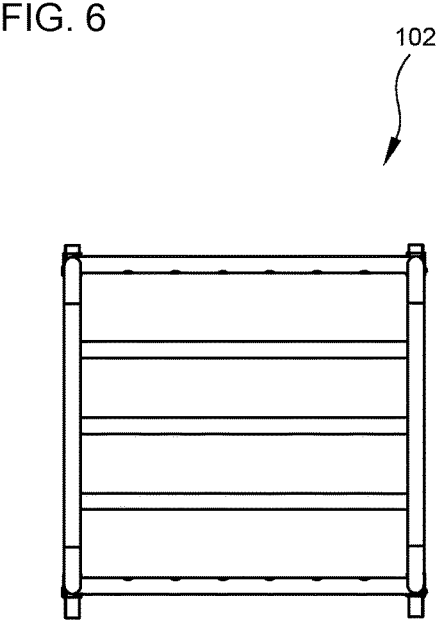
FIG. 6 is a top view of the frame of the storage device in the first embodiment.

FIG. 4 is a side view of the frame 102 of the storage device 100. FIG. 5 is a front view of the frame 102 of the storage device 100. FIG. 6 is a top view of the frame 102 of the storage device 100. In the depicted example, the storage device 100 has the shape of an open rectangular prism with four sides and a bottom. It is contemplated that in other embodiments, the storage device 100 may have a different shape by, for example, having fewer than four sides or more than four sides. It is also contemplated that in some embodiments the storage device may have a cylindrical shape.

Figure 7:
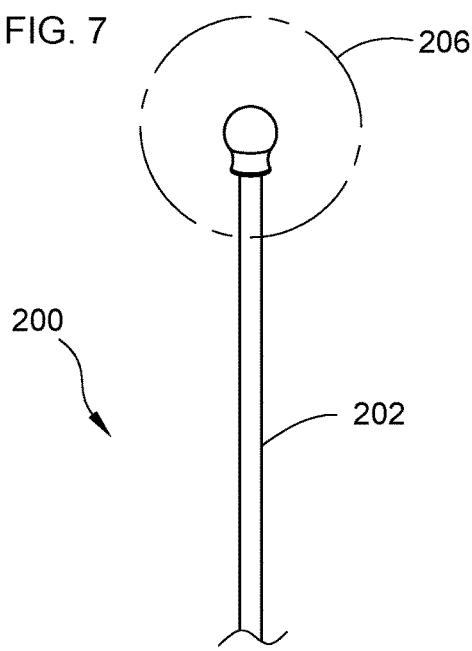
FIG. 7 is view of an elastic cord.
Figure 8:
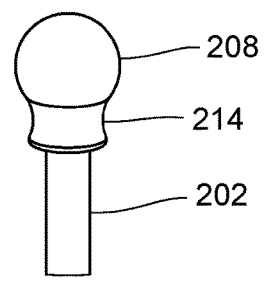
FIG. 8 is an enlarged view of a second end of the elastic cord in FIG. 7.
Figure 9:
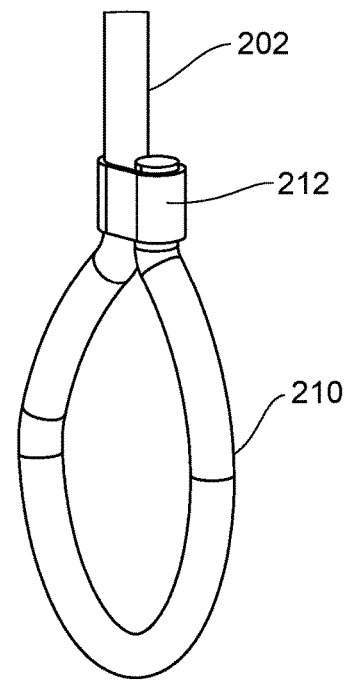
FIG. 9 is an enlarged view of a first end of the elastic cord in FIG. 7.

FIG. 7 is view of an elastic cord 200 having an elastic body 202, a first end 204, and a second end 206. The elastic body 202 is a single length or piece of elastic cord that is substantially longer than the first and second ends 204, 206, and that connects the first and second ends 204, 206. FIG. 8 is an enlarged view of the second end 206 in FIG. 7. At the second end 206 of the elastic cord 200, an enlarged body 208 is coupled to the elastic body 202. The enlarged body 208 is depicted in the figures as having a spherical shape with a neck or collar 214 extending therefrom. It is contemplated that in other embodiments the enlarged body 208 may have a shape different from a spherical shape, and thus the spherical shape depicted in the figures is by way of example. FIG. 9 is an enlarged view of the first end 204 in FIG. 7. At the first end 204 of the elastic cord 200, a loop 210 is disposed on the elastic body 202. In the depicted example, a clip 212 couples a distal end of the elastic body 202 to a section of the elastic body 202 for forming the loop 210. In other embodiments, the loop 210 may be formed without a clip 212 such that the loop 210 is integral with the shape of the elastic body 202. In at least some embodiments, the elastic cord 200 is made from a rubber material so that the elastic cord 200 is flexible and stretchable.

Figure 10:
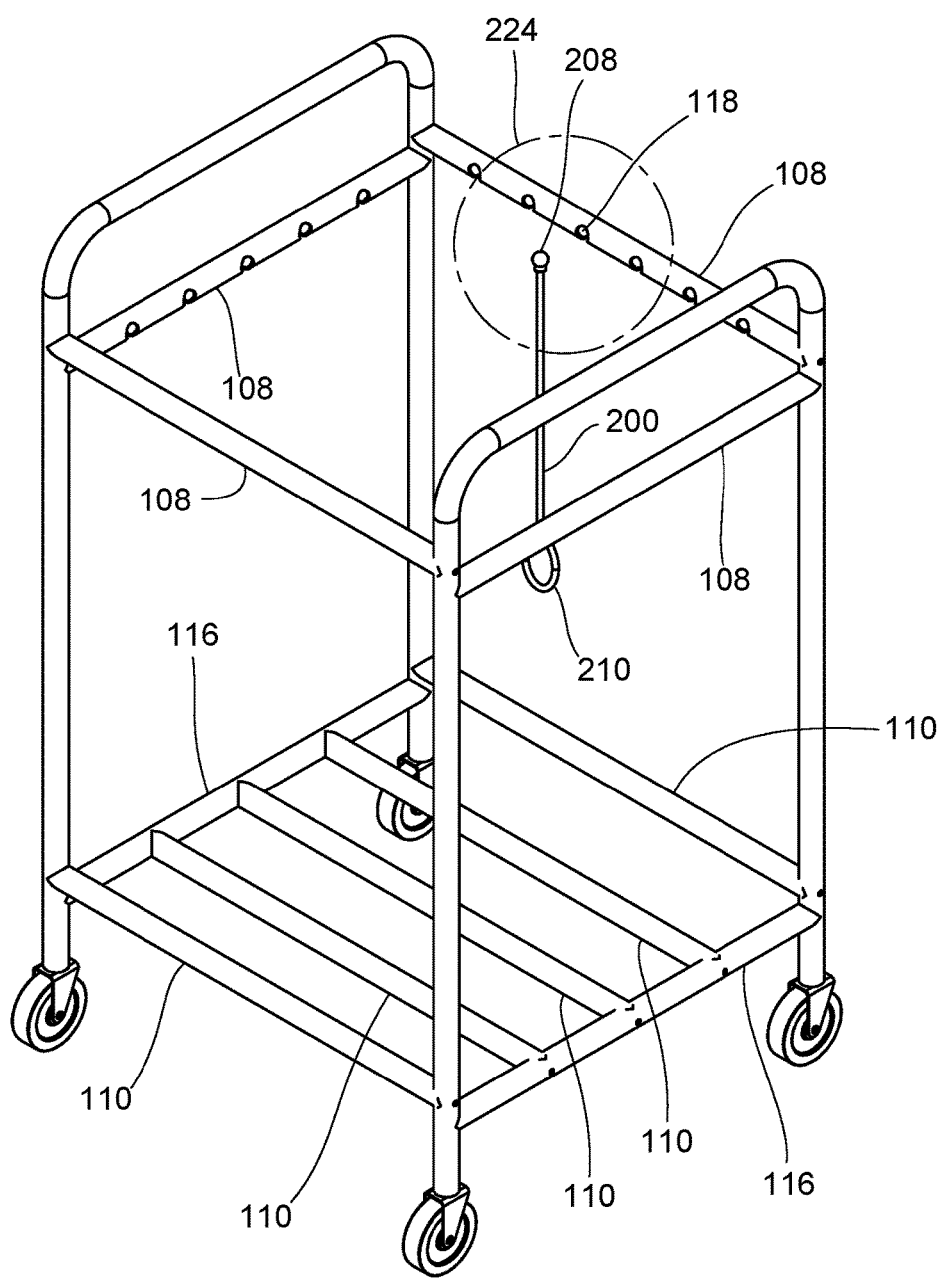
FIG. 10 is a top perspective view of an alignment of an elastic cord and the frame.
Figure 11:
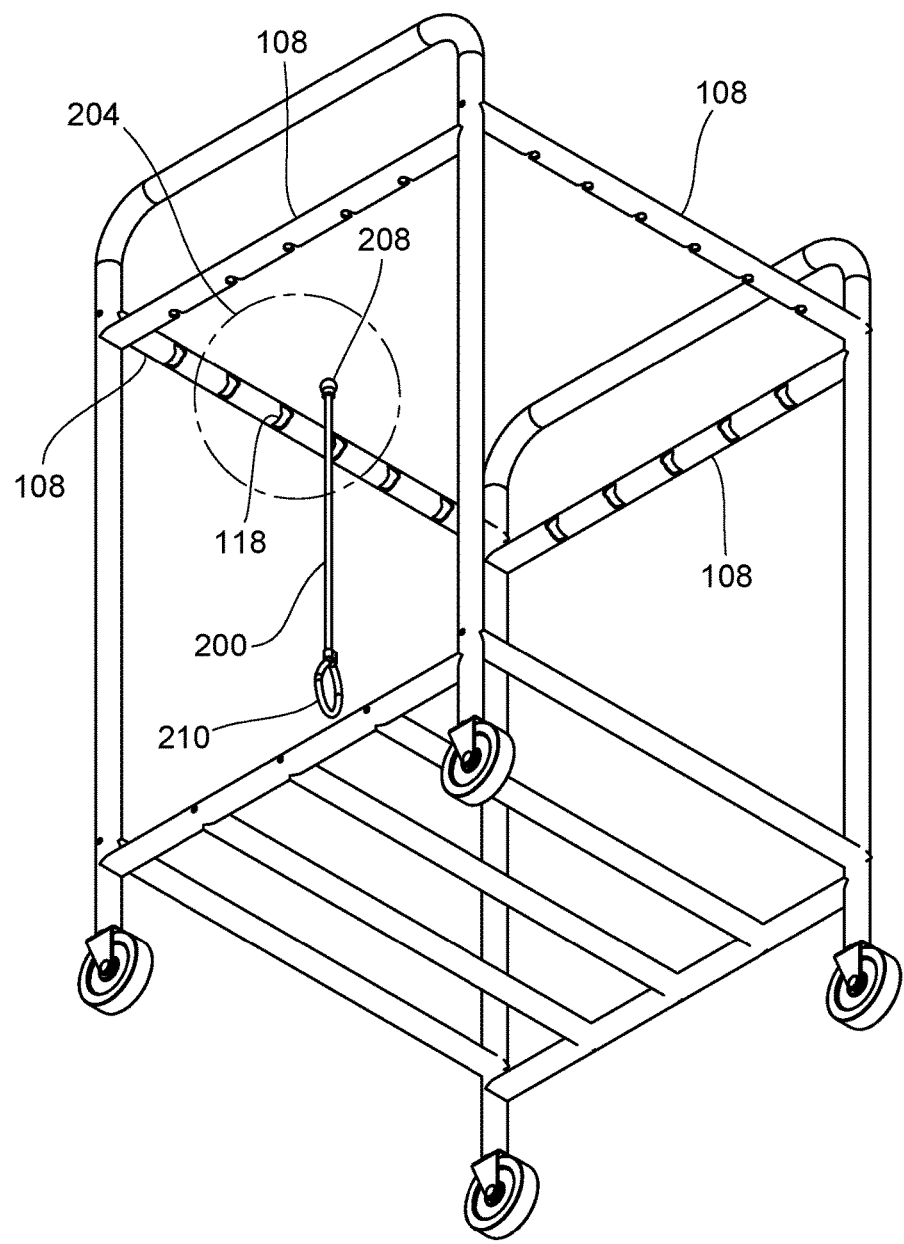
FIG. 11 is a bottom perspective view of an alignment of an elastic cord and the frame.

FIGS. 10 and 11 are top and bottom perspective views of an alignment 224 of an elastic cord 200 adjacent to a key-holed cross bar 108 of the frame 102. In the alignment 224, the enlarged body 208 of the elastic cord 200 is aligned with a keyhole 118 of the key-holed cross bar 108. In the examples depicted in FIGS. 10 and 11, the loop 210 of the elastic body 200 is orientated towards the bottom of the frame 102 close to a cross bar 110.

Figure 12:
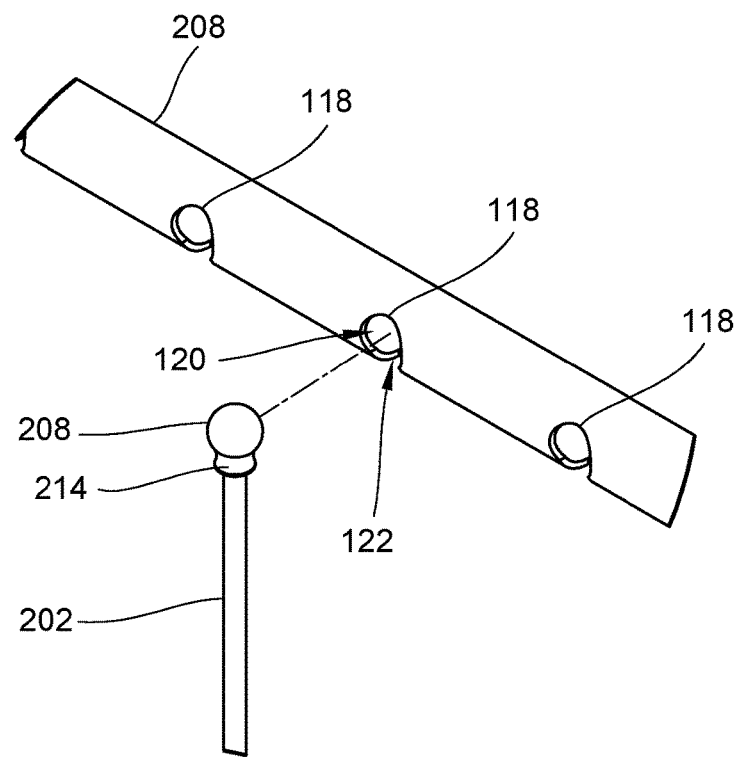
FIG. 12 is an enlarged view of the alignment depicted in FIG. 10.
Figure 13:
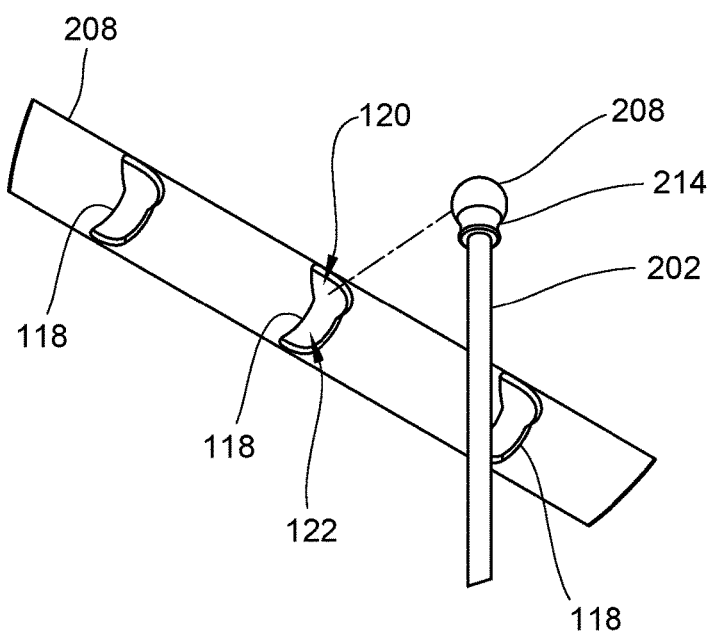
FIG. 13 is an enlarged view of the alignment depicted in FIG. 11.

FIGS. 12 and 13 are enlarged views of the alignment 224 from top and bottom perspectives, respectively. As described above, each keyhole 118 comprises an enlarged opening 120 and a channel 122. The profile of the enlarged body 208 of the elastic cord 200 matches the profile of the enlarged opening 120 of the keyhole 118 with the exception that the profile of the enlarged body 208 is slightly smaller by a defined tolerance than the profile of the enlarged opening 120. For example, the width of the enlarged body 208 may be about 94% to about 96% the width of the enlarged opening 120. The defined tolerance allows the enlarged body 208 to be positioned inside the enlarged opening 120 of the keyhole 118. As described above, the channel 122 has a width that is less than the width of the enlarged opening 120. The channel 122 maintains the enlarged body 208 of the elastic cord 200 in the keyhole 118 by preventing the enlarged body 208 from passing through the channel 122. The width of the channel 122 is large enough to allow the elastic body 202 and neck 214 of the elastic cord 200 to pass through. In this manner, an elastic cord 200 can be coupled to a key-holed cross bar 108 in the frame 102 of the storage device 100.

Figure 14:
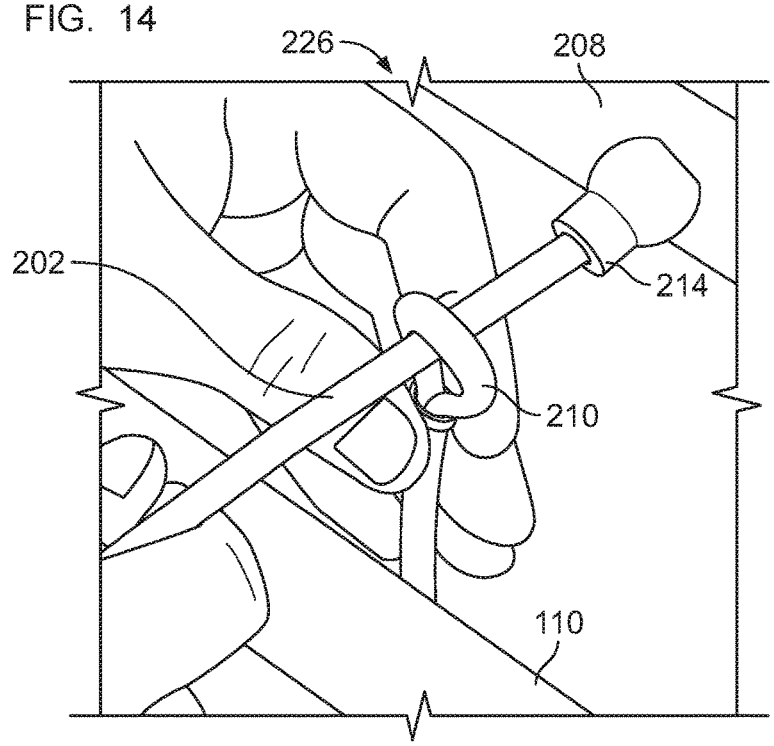
FIG. 14 is an enlarged view of a knot for coupling an elastic cord to a cross bar.
Figure 15:
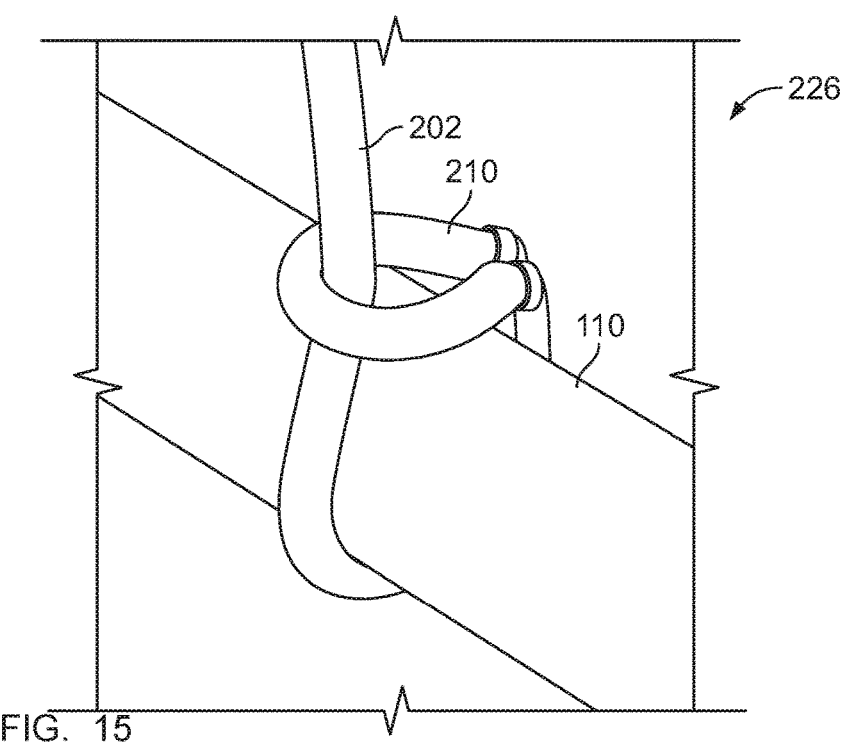
FIG. 15 is another enlarged view of a knot for coupling an elastic cord to a cross bar.

FIGS. 14 and 15 depict a knot 226 for coupling the elastic cord 200 to a cross bar 110 of the frame 102 of the storage device 100. The knot 226 is formed by positioning the enlarged body 208 at the second end 206 of the elastic cord 200 around the cross bar 110 and through the loop 210 at the first end 204 of the elastic cord 200. The enlarged body 208 can be pulled for tightening the knot 226 around the cross bar 110. In this manner, an elastic cord 200 is securely coupled to the cross bar 110. In one example, the cross bar 110 may include position markers for guiding the placement of multiple knots 226 on the cross bar 110.

Figure 16:
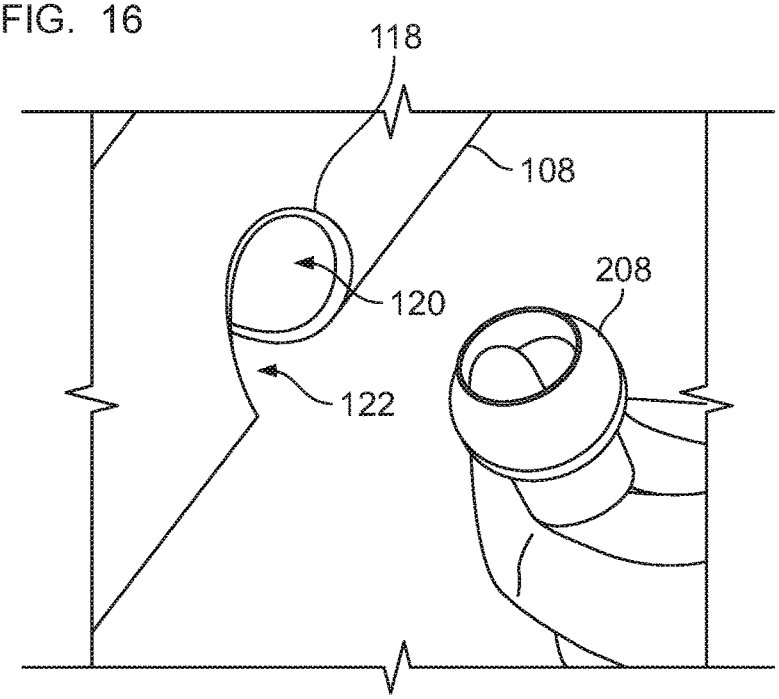
FIG. 16 is a view of an enlarged body of an elastic loop positioned next to a keyhole.
Figure 17:
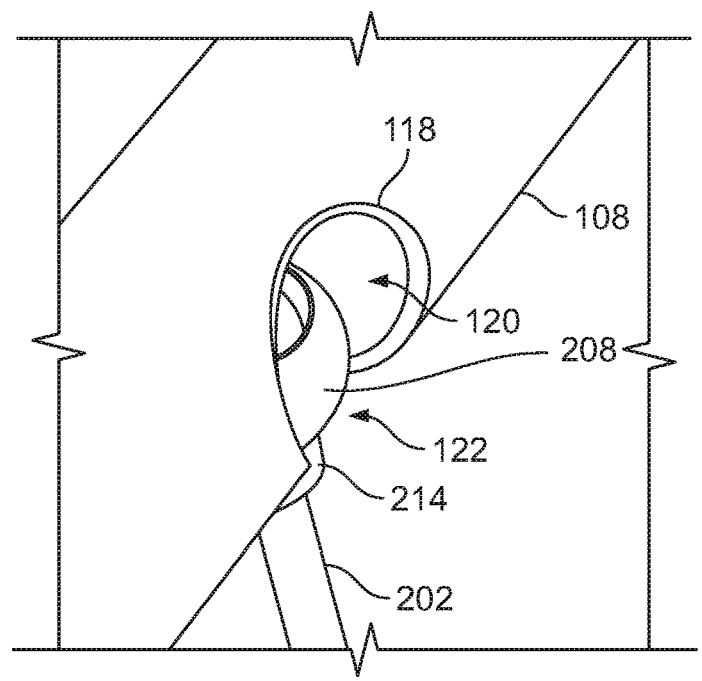
FIG. 17 is a view of an enlarged body of an elastic loop positioned inside a keyhole.

FIG. 16 is a view of the enlarged body 208 of the elastic loop 200 positioned next to a keyhole 118 in the key-holed cross bar 108. FIG. 17 depicts the enlarged body 208 positioned inside the keyhole 118 of the key-holed cross bar 108. As described above, each keyhole 118 comprises an enlarged opening 120 and a channel 122. The profile of the enlarged body 208 is slightly smaller than the profile of the enlarged opening 120 allowing the enlarged body 208 to be positioned inside the enlarged opening 120 of the keyhole 118 as depicted in FIG. 17. The channel 122 has a width that is less than the width of the enlarged opening 120 which maintains the enlarged body 208 of the elastic cord 200 in the keyhole 118 by preventing the enlarged body 208 from passing through the channel 122. In this manner, an elastic cord 200 is coupled to a key-holed cross bar 108 in the frame 102 of the storage device 100. The width of the channel 122 is large enough to allow the neck 214 and the elastic body 202 of the elastic cord 200 to pass through. As depicted in FIG. 17, the neck 214 engages the channel 122 when the enlarged body 208 is positioned inside the keyhole 118. The neck 214 is a protective barrier that prevents the elastic body 202 of the elastic cord 200 from rubbing against or touching directly the keyhole 118.

Figure 18:
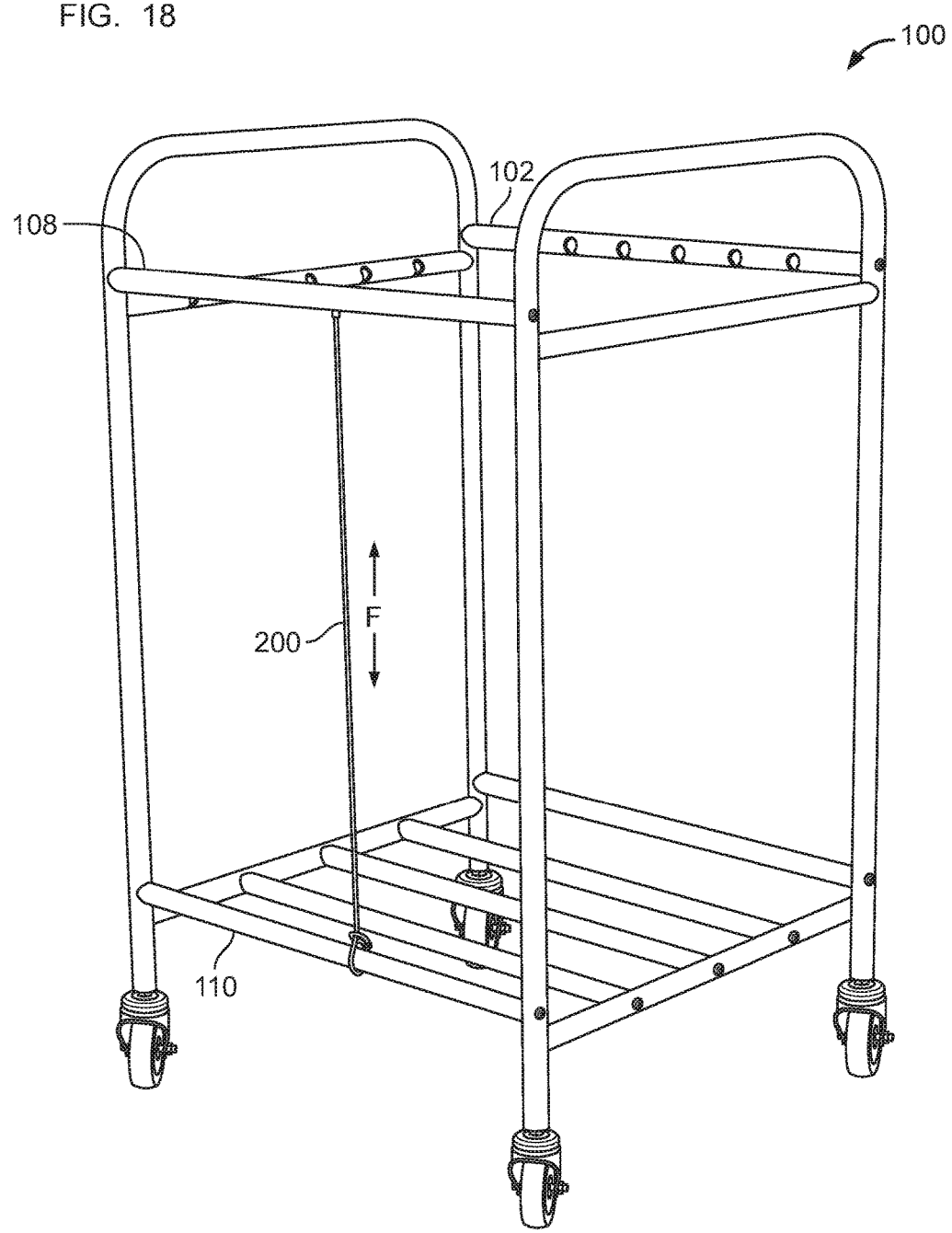
FIG. 18 is a view of an elastic cord coupled to the frame in the first embodiment.
Figure 19:
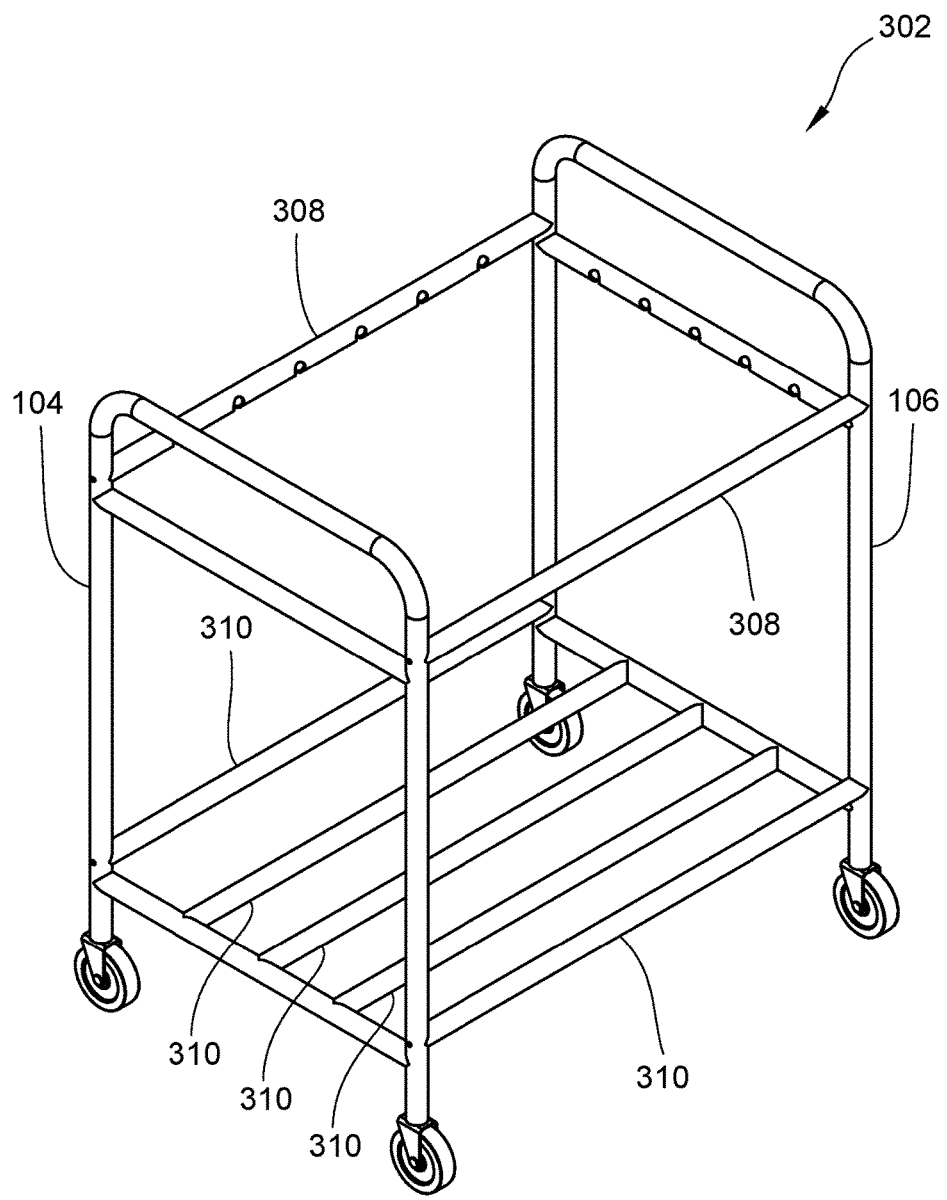
FIG. 19 is a top perspective view of an alternative frame for the storage device in the first embodiment.
Figure 20:
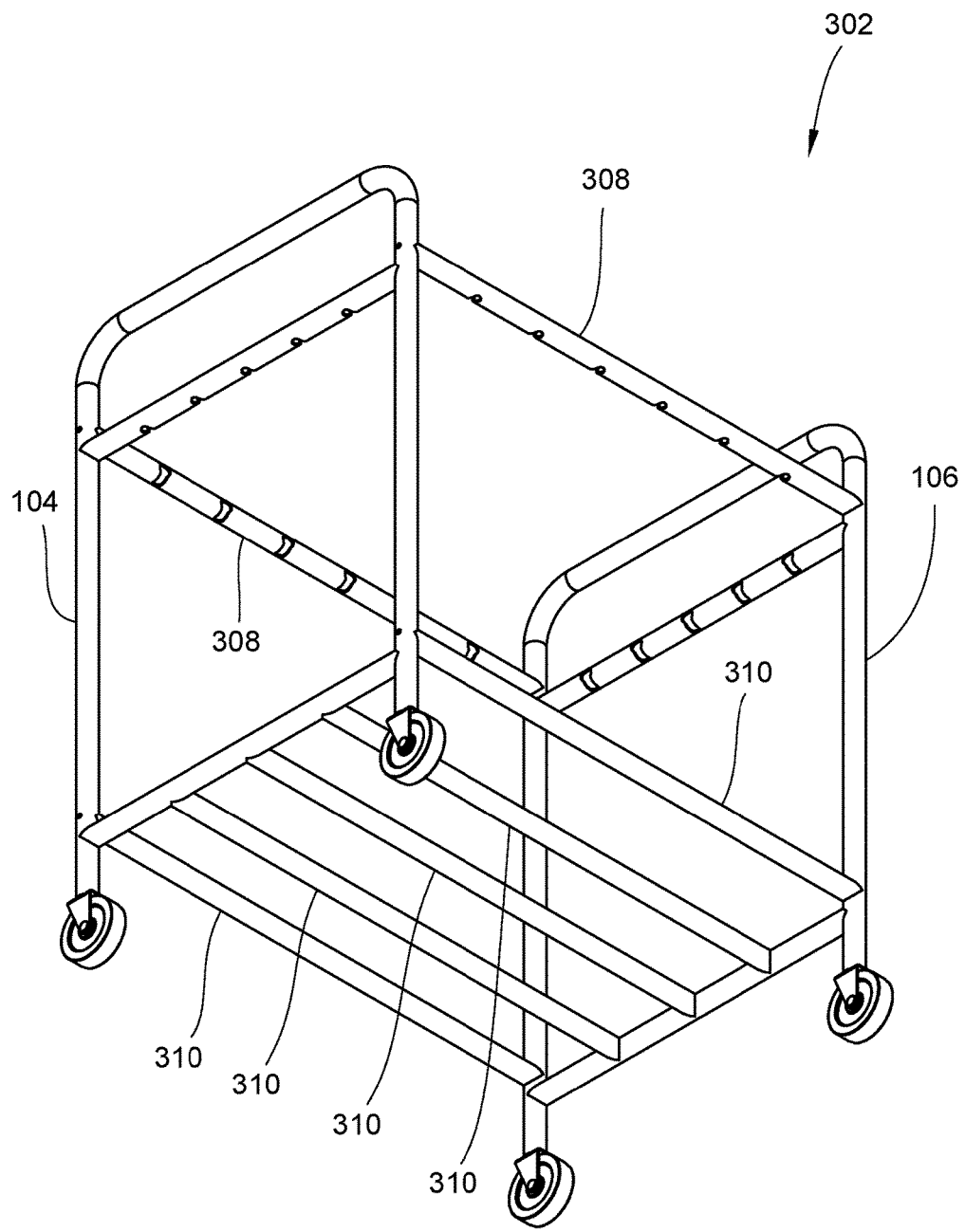
FIG. 20 is a bottom perspective view of the alternative frame of FIG. 19.
Figure 21:
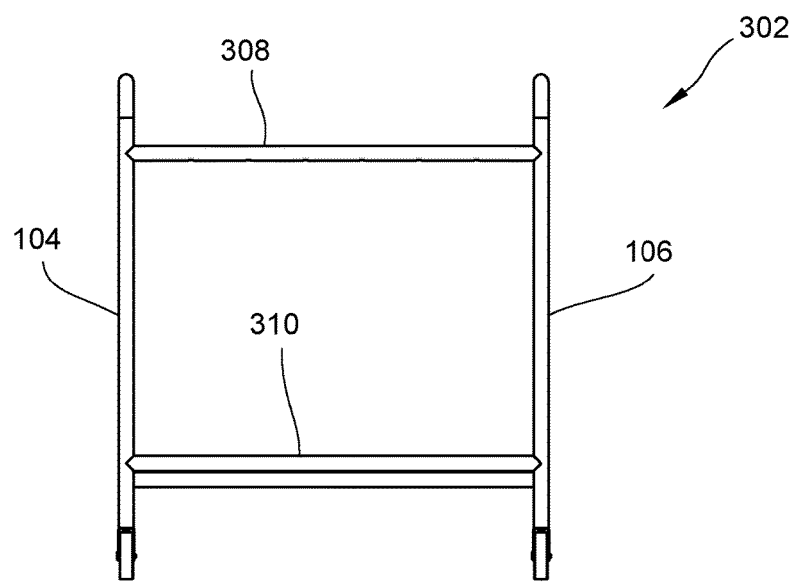
FIG. 21 is a side view of the alternative frame of FIG. 19.
Figure 22:
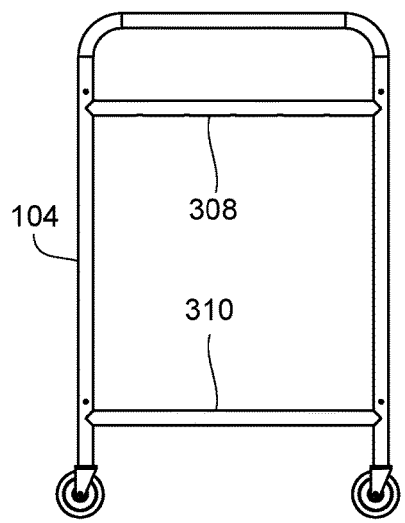
FIG. 22 is a front view of the alternative frame of FIG. 19.
Figure 23:
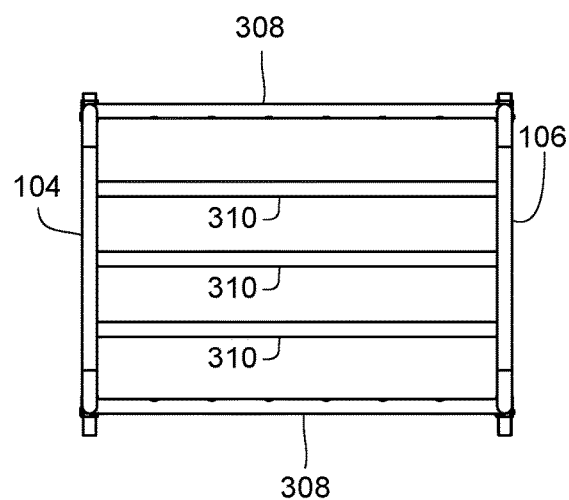
FIG. 23 is a top view of the alternative frame of FIG. 19.

FIG. 18 depicts an elastic cord 200 coupled to the key-holed cross bar 108 and the cross bar 110. The elastic cord 200 has a length that slightly less than the distance between the key-holed cross bar 108 and the cross bar 110. For example, the length of the elastic cord 200 may be about 68% to about 72% the distance between the key-holed cross bar 108 and the cross bar 110. The shorter length of the elastic cord 200 produces a modest tension force F when the first end 204 of the elastic cord 200 is coupled to the cross bar 110 and the enlarged portion 208 is positioned in the keyhole 118. The small tension force F stretches the elastic body 202 such that the elastic cord 200 is taut when coupled to the frame 102 of the storage device 100.

As described above with reference to FIG. 1, the storage device 100 when assembled includes a plurality of elastic cords 200 that in combination create a penetrable barrier. Accordingly, multiple elastic cords 200 are coupled to the key-holed cross bar 108 and the cross bar 110 as described above with reference to FIGS. 10-17.

FIGS. 19-23 are top perspective, bottom perspective, side, front, and plan views of a frame 302 for the storage device 100. The frame 302 is substantially similar to the frame 102 and shares many similar features. Although not depicted, the elastic cords 200 couple to the frame 302 in the same way as in frame 102. The frame 302 differs from the frame 102 with respect to the dimensions of the frame 302. As compared to the frame 102, the frame 302 is larger. For example, the pair of key-holed cross bars 308 and the cross bars 310 used to connect the uprights 304, 306 may have an extended length such that the length of the frame 302 is longer.

Figure 24:
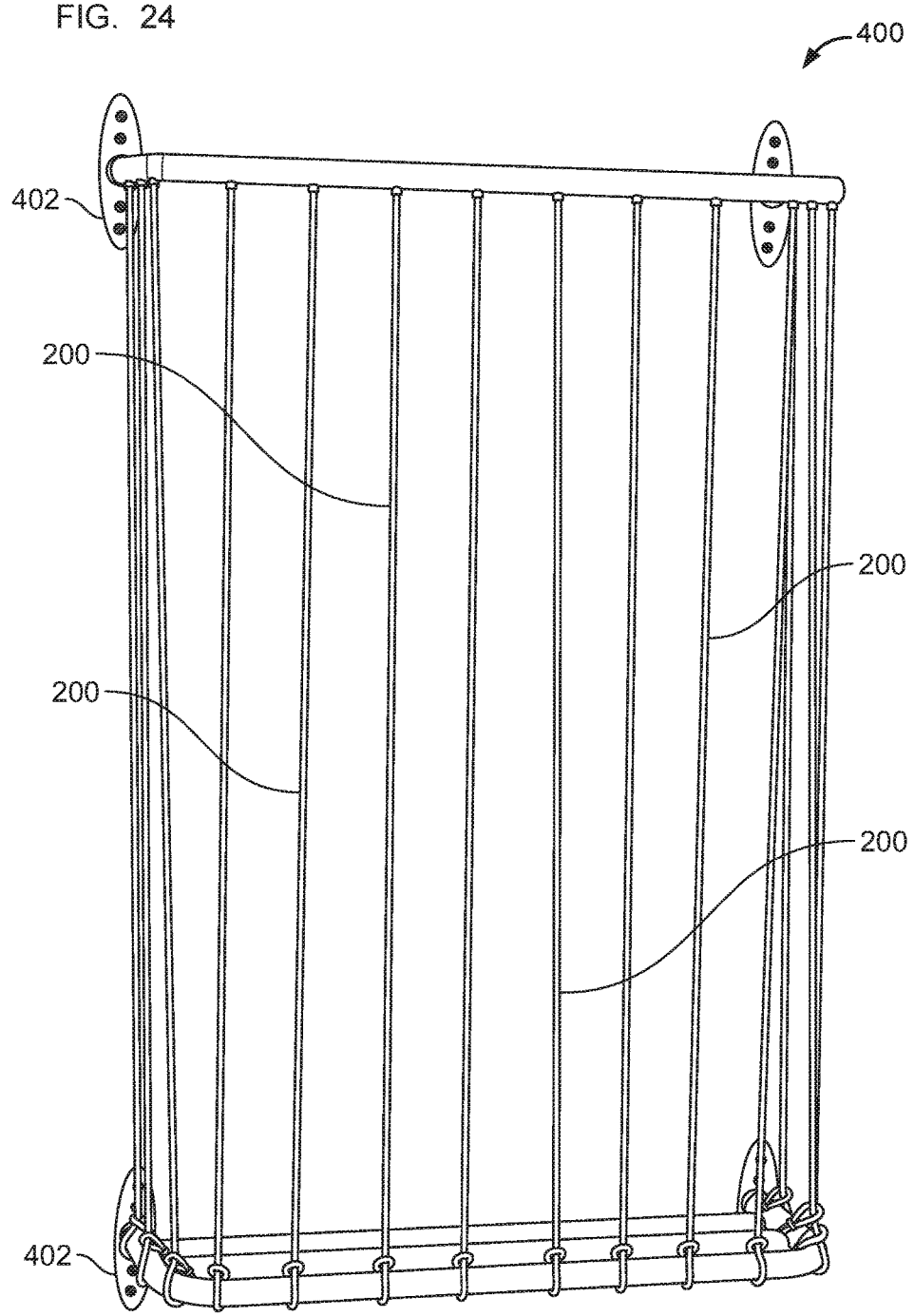
FIG. 24 is a perspective view of a second embodiment of an assembled storage device.

FIG. 24 is a perspective view of a second embodiment of an assembled storage device 400 that can be mounted to a wall. Like in the first and second embodiments, the storage device 400 includes a frame 402 and a plurality of elastic cords 200 that when coupled to the frame 402, create a penetrable barrier around the storage device 400 so that objects can be kept within the confines of the storage device 400 while at the same time a user can stretch a pair of elastic cords 200 to pull an item through the penetrable barrier formed by the elastic cords 200.

Figure 25:
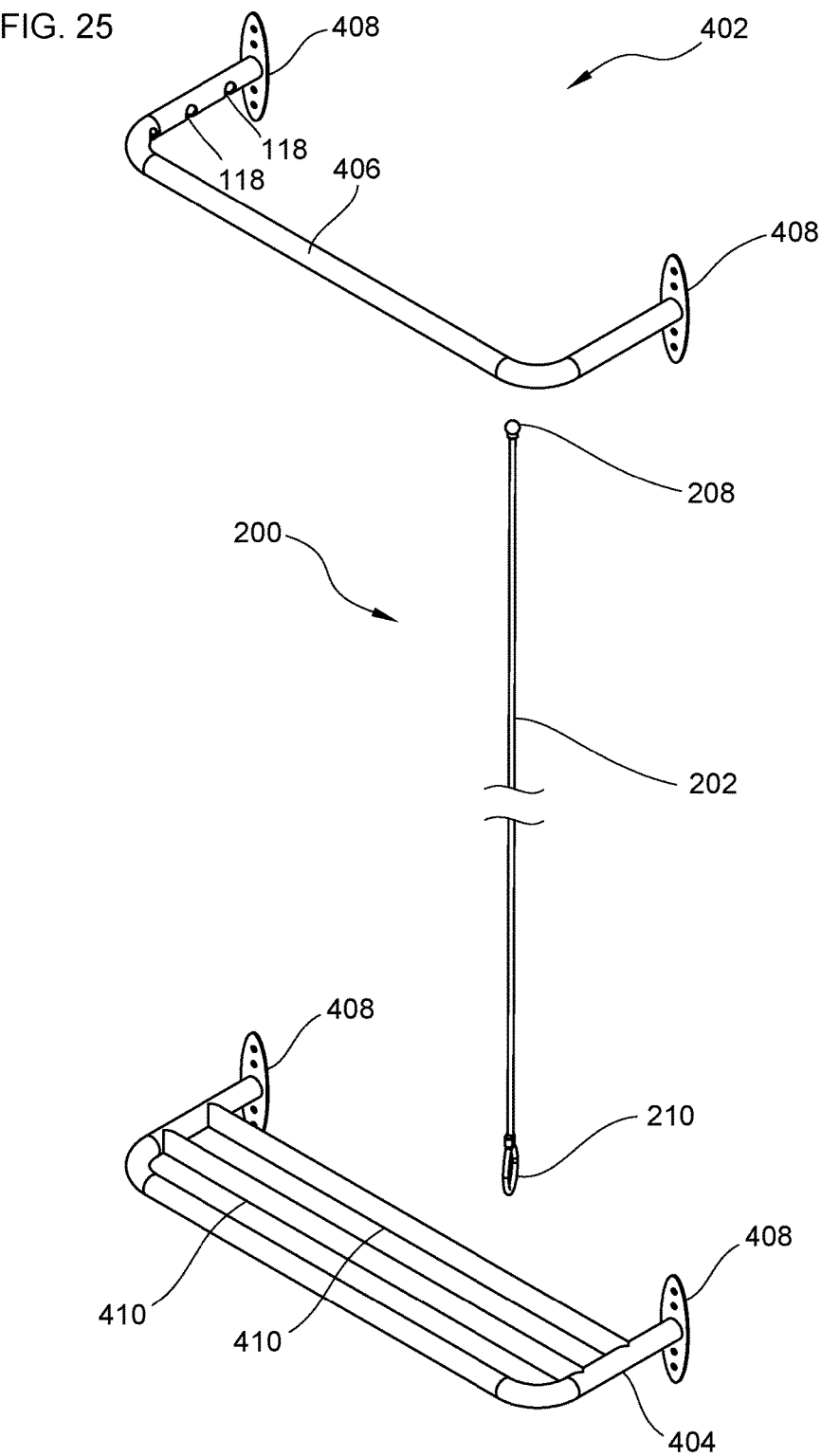
FIG. 25 is a top perspective view of the frame in the second embodiment.
Figure 26:
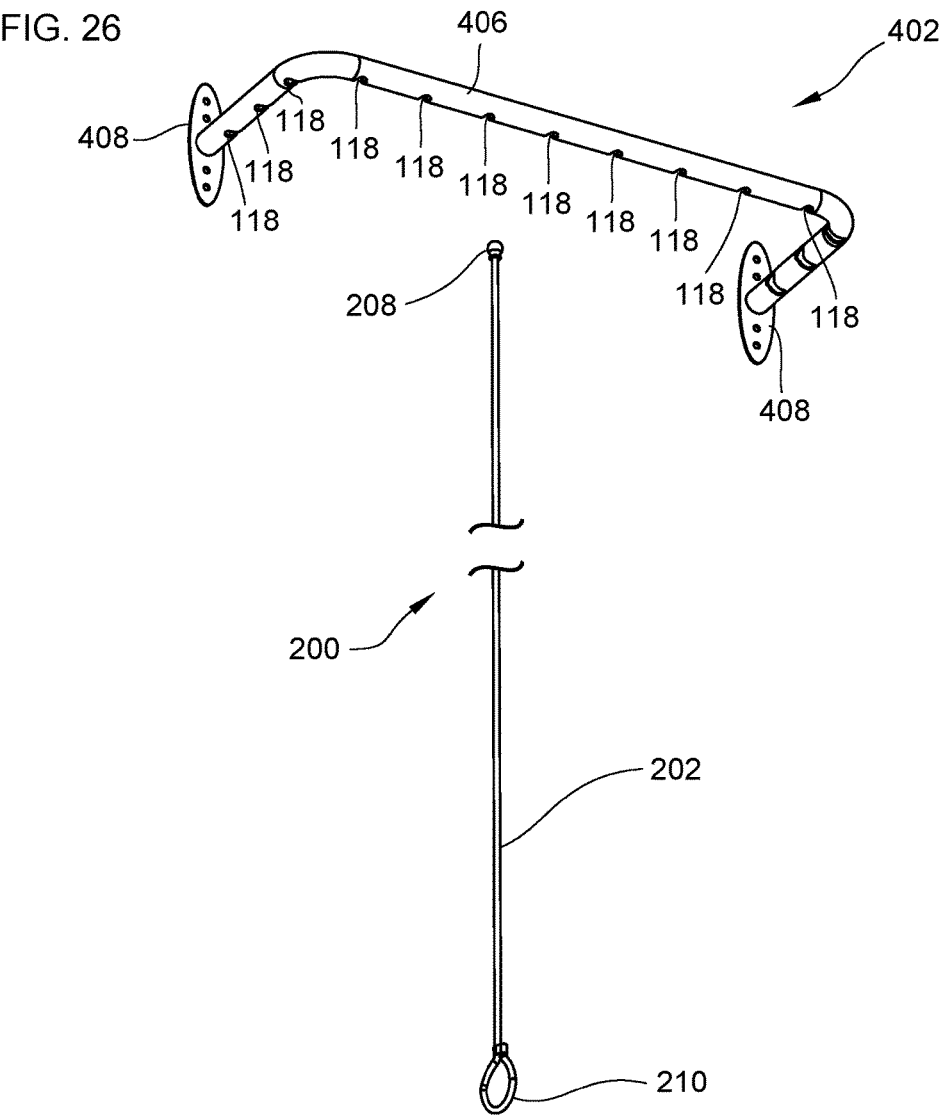
FIG. 26 is a bottom perspective view of the frame in the second embodiment.
Figure 27:
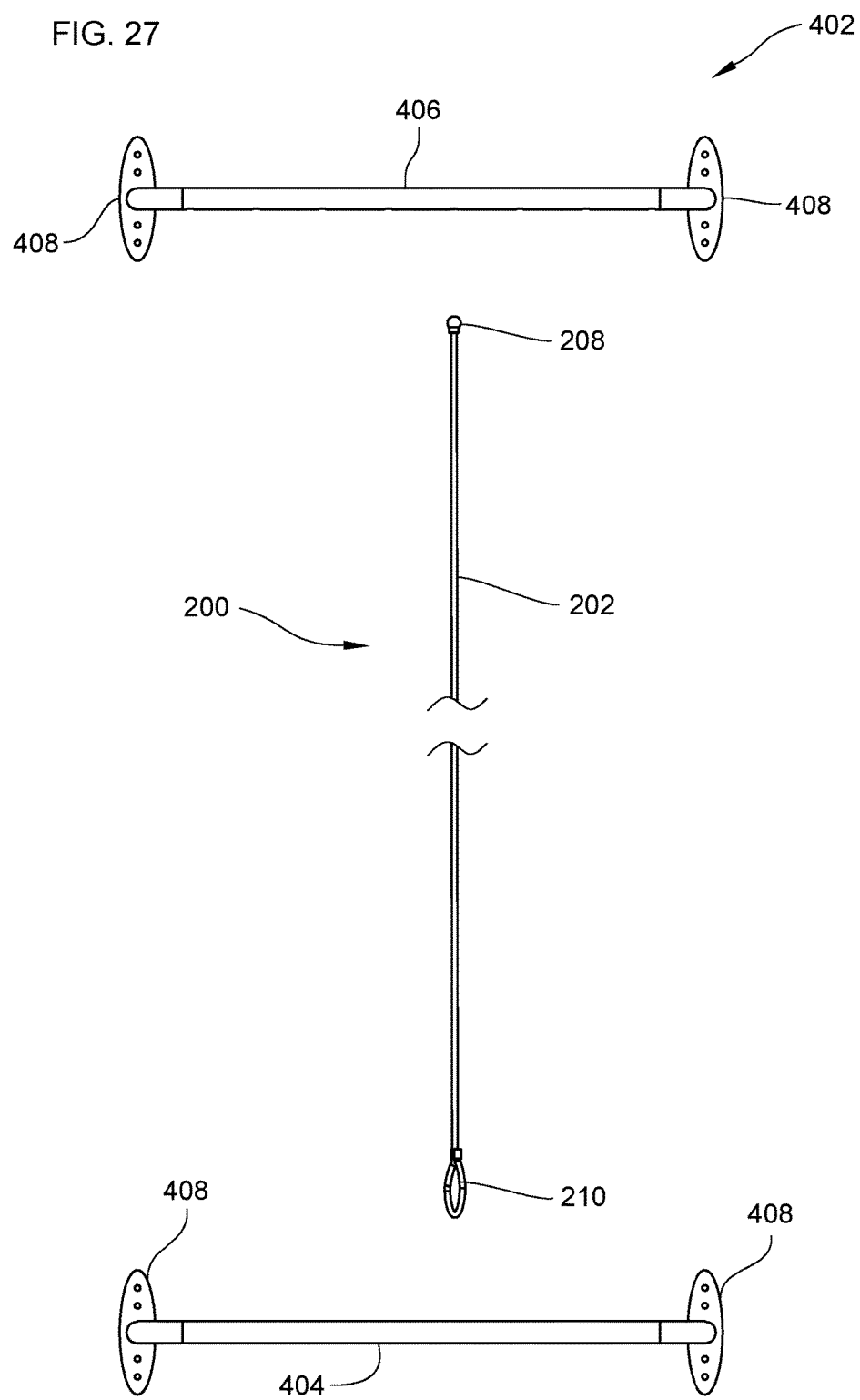
FIG. 27 is a front view of the frame in the second embodiment.
Figure 28:
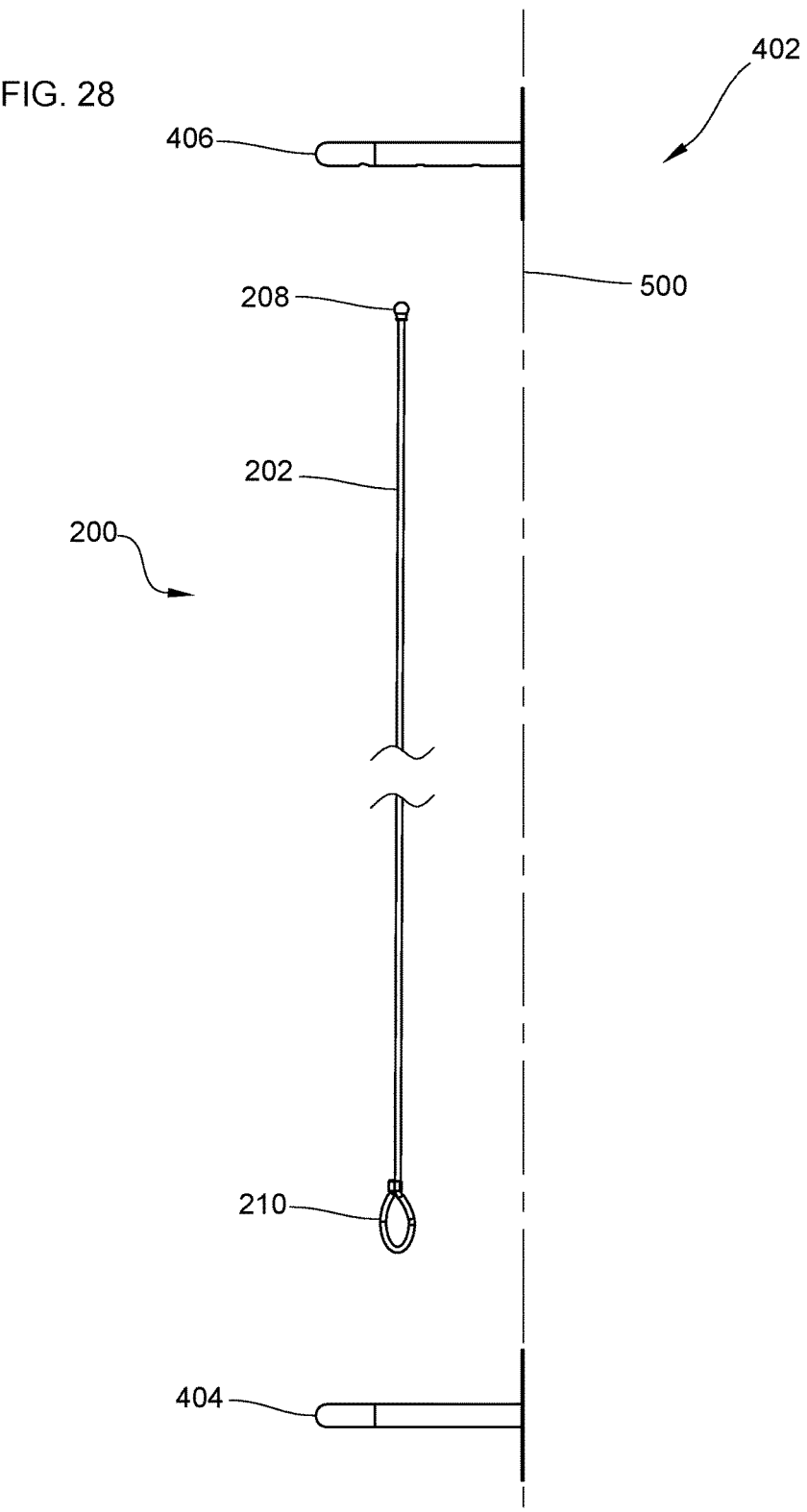
FIG. 28 is a side view of the frame in the second embodiment.

FIG. 25 is a top perspective view of the frame 402 with respect to an elastic cord 200; FIG. 26 is a bottom perspective view of the frame 402 with respect to an elastic cord 200; FIG. 27 is a front view of the frame 402 with respect to an elastic cord 200; and FIG. 28 is a side view of the frame 402 with respect to an elastic cord 200 and a wall 500. The frame 402 includes a first tubular member 404 and a second tubular member 406. Each of the first and second tubular members 404, 406 have a pair of mounting brackets 408 for receiving one or more fasteners (not shown) for attaching the first and second tubular members 404, 406 to a wall 500. Any type of fastener may be used with the mounting brackets 408 such as, for example, screws or bolts.

One or more cross bars 410 may be coupled to the first tubular member 404. The one or more cross bars 410 prevent objects from passing through the bottom of the storage device 400.

The second tubular member 406 includes a series of keyholes 118 running along its perimeter. The keyholes 118 are similar to the keyholes 118 describe above with regard to the first embodiment. The number of keyholes 118 disposed in the second tubular member 406 may vary as required or desired for a particular application.

Elastic cord 200 is depicted in FIGS. 25-28 with respect to the first and second tubular members 404, 406. The elastic cord 200 is similar to the keyholes 118 describe above with regard to the first embodiment. The elastic cord 200 depicted in FIGS. 25-28 includes the enlarged body 208 which is orientated towards the second tubular member 406, and also includes the loop 210 which is orientated towards the first tubular member 404. The elastic body 202 runs between the enlarged body 208 and the loop 210 in the elastic cord 200.

Figure 30:
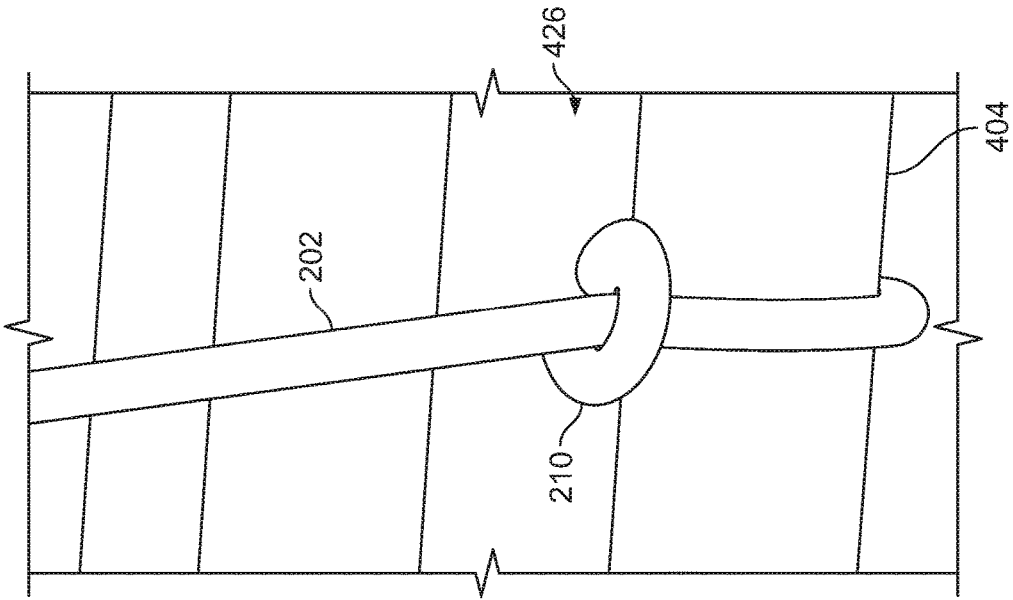
FIG. 30 is another view of a knot for coupling an elastic cord to a first tubular member.
Figure 29:
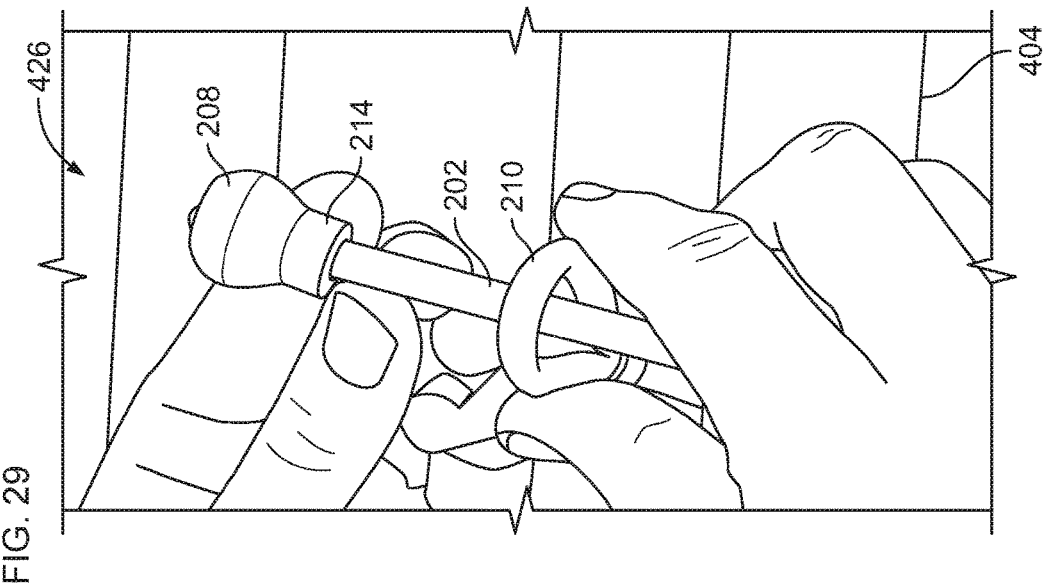
FIG. 29 is an enlarged view of a knot for coupling an elastic cord to a first tubular member.

Like in the first embodiment, the elastic cord 200 is coupled to the first tubular member 404 by a knot 426. FIGS. 29 and 30 depict the knot 426 for coupling the elastic cord 200 to the first tubular member 404. The knot 426 is formed by positioning the enlarged body 208 at the second end 206 of the elastic cord 200 around the first tubular member 404 and through the loop 210 at the first end 204 of the elastic cord 200. The enlarged body 208 can be pulled for tightening the knot 426 around the first tubular member 404. In this manner, an elastic cord 200 is securely coupled to the first tubular member 404. In one example, the first tubular member 404 may include position markers for guiding the placement of multiple knots 426 on the first tubular member 404.

Like in the first embodiment, an elastic cord 200 is coupled to the second tubular member 406 by inserting the enlarged body 208 of the elastic loop 200 into a keyhole 118 in the second tubular member 406. FIG. 31 is a view of the enlarged body 208 positioned next to a keyhole 118 in the second tubular member 406. FIG. 17 depicts the enlarged body 208 positioned inside the keyhole 118 of the second tubular member 406. As described above, each keyhole 118 comprises an enlarged opening 120 and a channel 122. The profile of the enlarged body 208 is slightly smaller than the profile of the enlarged opening 120 allowing the enlarged body 208 to be positioned inside the enlarged opening 120 of the keyhole 118 as depicted in FIG. 32. The channel 122 has a width that is less than the width of the enlarged opening 120 which maintains the enlarged body 208 of the elastic cord 200 in the keyhole 118 by preventing the enlarged body 208 from passing through the channel 122. In this manner, an elastic cord 200 is coupled to a key-holed cross bar 108 in the frame 402 of the storage device 400. The width of the channel 122 is large enough to allow the neck 214 and the elastic body 202 of the elastic cord 200 to pass through. As depicted in FIG. 32, the neck 214 engages the channel 122 when the enlarged body 208 is positioned inside the keyhole 118. The neck 214 is a protective barrier that prevents the elastic body 202 of the elastic cord 200 from rubbing against or touching directly the keyhole 118.

Figure 33:
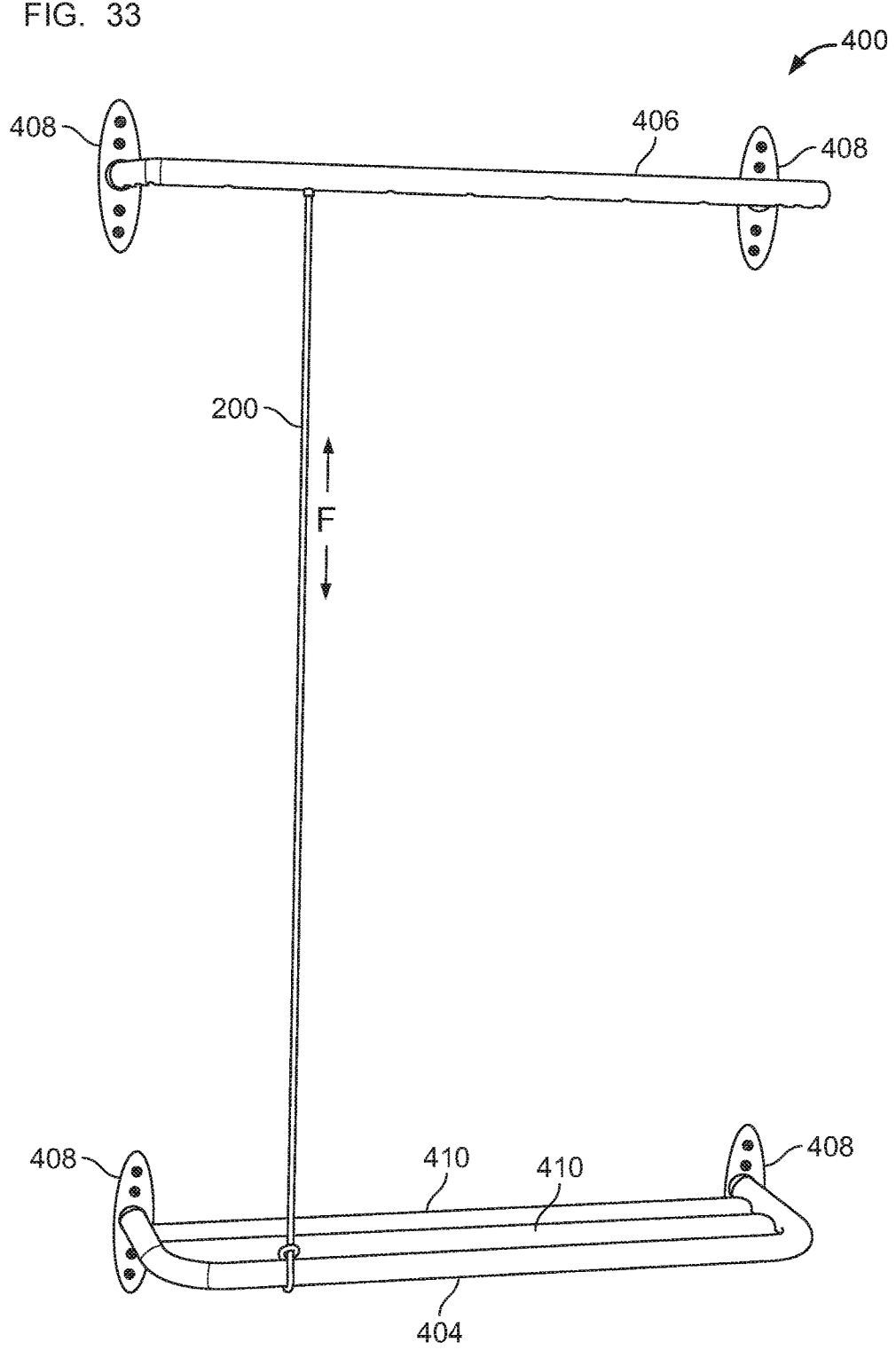
FIG. 33 is a view of an elastic cord coupled to the frame in the second embodiment.

FIG. 33 depicts an elastic cord 200 coupled to the second tubular member 406 and the first tubular member 404. The elastic cord 200 has a length that slightly less than the distance between the first and second tubular members 404, 406. For example, the length of the elastic cord 200 may be about 80% to about 84% the distance between the first and second tubular members 404, 406. The shorter length of the elastic cord 200 produces a modest tension force F when the first end 204 of the elastic cord 200 is coupled to the first tubular member 404 and the enlarged portion 208 is positioned in the keyhole 118 of the second tubular member 406. The small tension force F stretches the elastic body 202 such that the elastic cord 200 is taut when coupled to the frame 402 of the storage device 400. Like in the first embodiment, it is contemplated that orientation of the first and second tubular members 404, 406 may be reversed such that the second tubular member 406 having the keyholes 118 is disposed at the bottom of the frame 402 and the first tubular member 404 is disposed at the top of the frame 402. In this case, the orientation of the elastic cords 200 when coupled to the frame 402 would be inverted such that the first end 204 of each elastic cord 200 would be coupled to a first tubular member 404 at the top of the frame 402, and the second end 206 of each elastic cord 200 would be coupled to a second tubular member 406 at the bottom of the frame 402.

Figure 34:
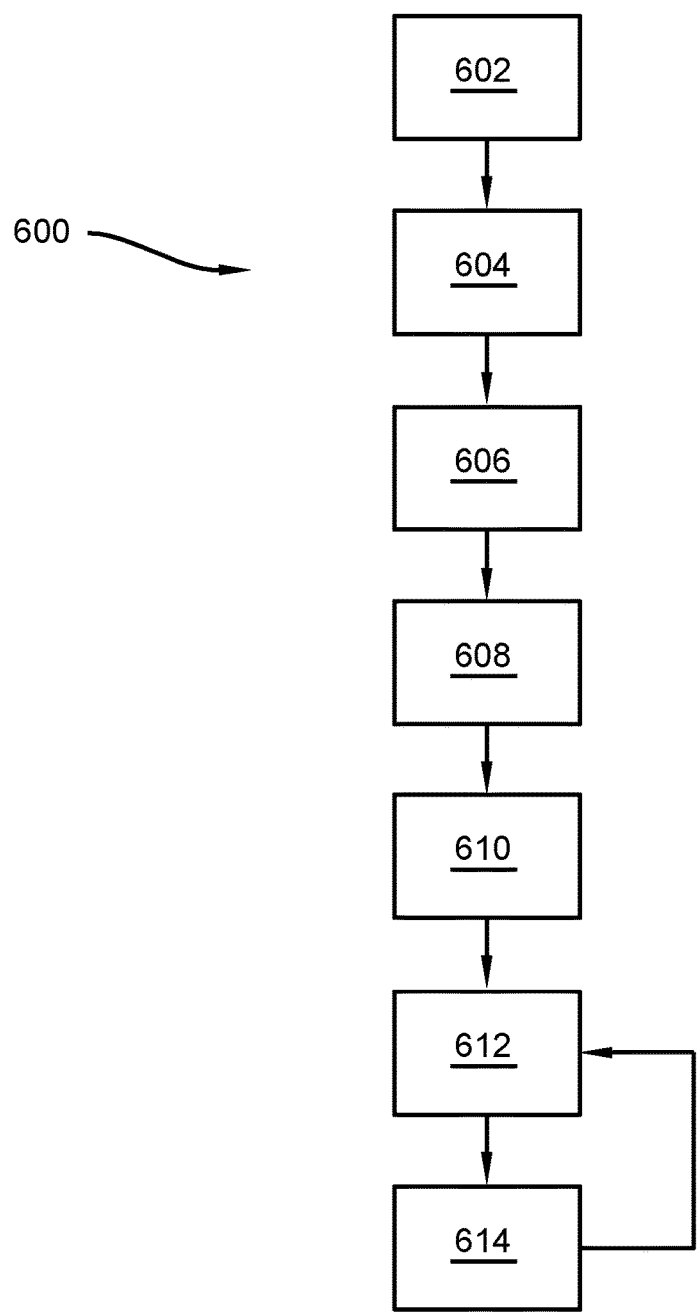
FIG. 34 depicts a method for assembling the first embodiment of the storage device.

The present disclosure further relates to a method 600 depicted in FIG. 34 for assembling the storage device 100. The method 600 may include a first step 602 of placing a first side frame 104 on a floor or flat surface. A second step 604 of coupling a key-holed cross bar 108 to the first side frame 104. In one example, a bolt and washer may be used to couple the key-holed cross bar 108 to the first side frame 104. The step 604 is repeated for coupling a second key-holed cross bar 108 to the first side frame 104. A step 606 includes attaching a cross bar 110 to the first side frame 104. In one example, a bolt and washer may be used to couple the cross bar 110 to the first side frame 104. The step 606 is repeated for coupling additional cross bars 110 to the first side frame 104. In one example, five cross bars 110 are coupled to the first side frame 104. A next step 608 includes attaching a second side frame 106 to the key-holed cross bars 108 and cross bars 110 that have been coupled to the first side frame 104. An optional step 610 may include inverting the assembly of the first and second side frames 104, 106 and attaching wheels to the bottoms of the first and second side frames 104, 106. A next step 612 includes positioning the assembly of the first and second side frames 104, 106 in an upright position, and coupling one elastic cord 200 by looping an enlarged body 208 of the elastic cord 200 through a loop 210 of the elastic cord 200 and around a cross bar 110. The enlarged body 208 can be pulled until a knot 226 is snug around the cross bar 110. A next step 614 includes inserting the enlarged body 208 into a keyhole 118 disposed in the key-holed cross bar 108. The steps 612 and 614 may be repeated so that a plurality of elastic cords 200 form a penetrable barrier in combination. In one exemplary embodiment, about 16-28 elastic cords 200 are coupled to the frame 102 of the storage device 100. In one particular example, 22 elastic cords 200 are coupled to the frame 102 of the storage device 100.

Figure 35:
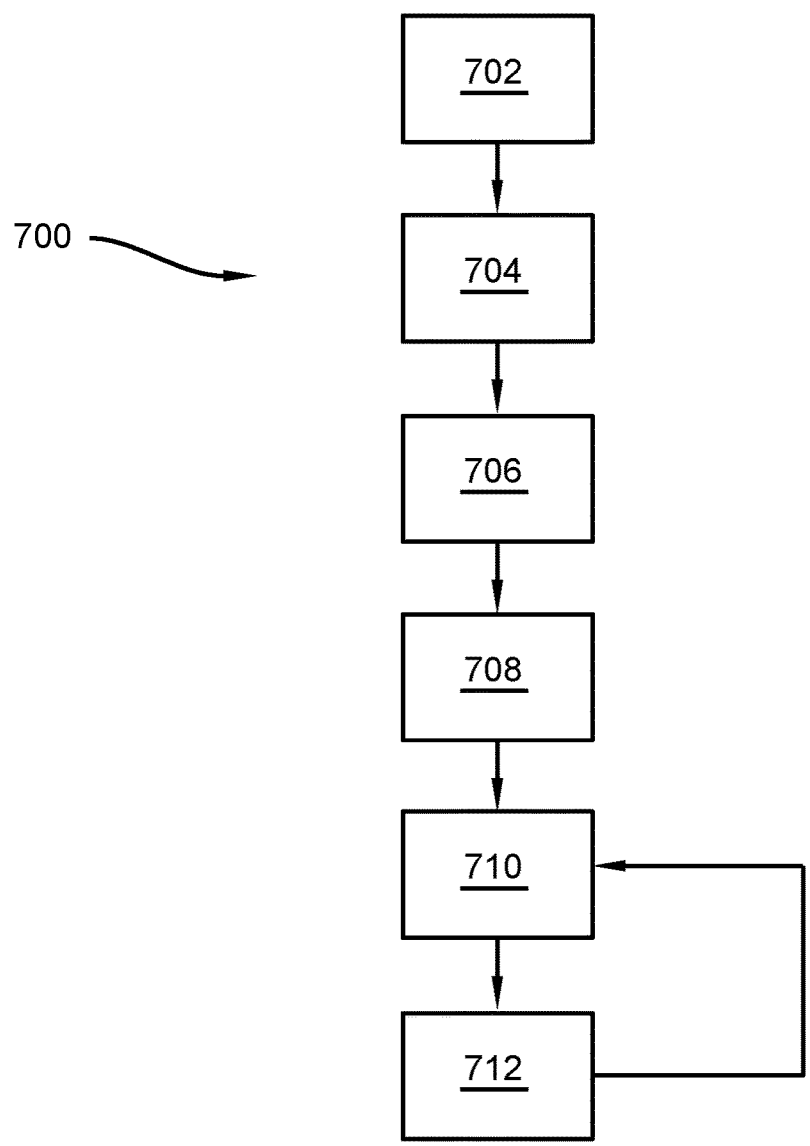
FIG. 35 depicts a method for assembling the second embodiment of the storage device.

FIG. 35 depicts a method 700 depicted in for assembling the storage device 400. The method 700 may include an optional first step 702 of marking a desired location on a wall 500 for mounting a top tubular member 406. A second step 704 of fastening the top tubular member 406 to the wall

500. In one example, screws may be used to fasten the top tubular member 406 to the wall 500. A next step 706 includes measuring a predefined distance from the center of the top tubular member 406 to a center of a bottom tubular member 404. In one example, the predefined distance is approximately 60 inches. The step 706 may further include marking on the wall 500 the desired location of the bottom tubular member 404. A next step 708 includes fastening the bottom tubular member 404 to the wall 500. In one example, screws may be used to fasten the bottom tubular member 404 to the wall 500. A further step 710 includes coupling one elastic cord 200 by looping an enlarged body 208 of the elastic cord 200 through a loop 210 of the elastic cord 200 and around the bottom tubular member 404. The enlarged body 208 can be pulled until a knot 226 is snug around the bottom tubular member 404. A next step 712 includes inserting the enlarged body 208 into a keyhole 118 disposed in the top tubular member 406. The steps 710 and 712 may be repeated so that a plurality of elastic cords 200 form a penetrable barrier in combination. In one exemplary embodiment, about 10-18 elastic cords 200 are coupled to the top and bottom tubular members 404, 406 of the storage device 400. In one particular example, 14 elastic cords 200 are coupled to the top and bottom tubular members 404, 406 of the storage device 400.

Figure 36:
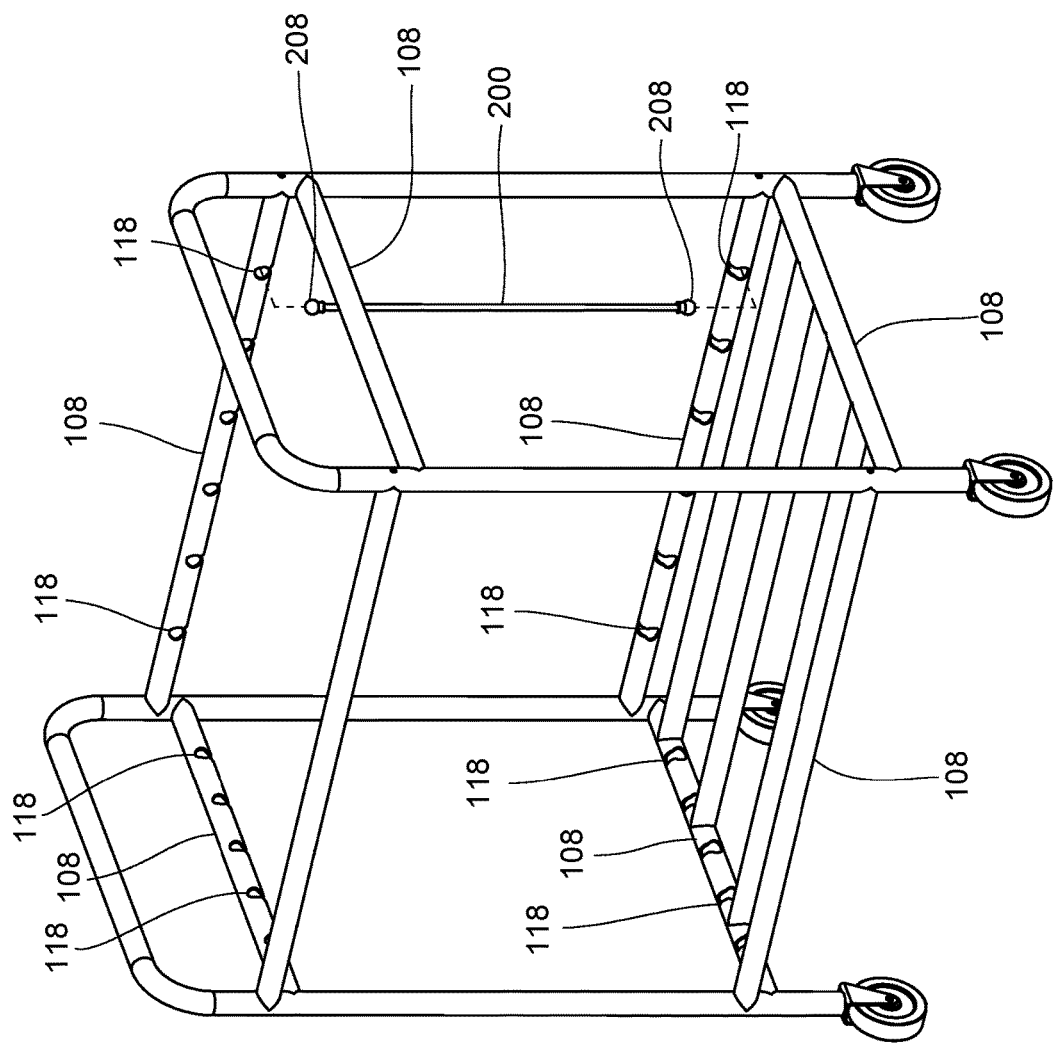
FIG. 36 is a view of an alternative embodiment of a storage device with an elastic cord having an enlarged body at both ends.

FIG. 36 depicts an alternative embodiment in which the elastic cord 200 includes the enlarged body 208 at both the first and second ends 204, 206 of the cord. The frame of the storage device in this embodiment is modified so that it includes opposing pairs of key-holed cross bars 108 (or an opposing pair of second tubular members 406 in the case of the second embodiment). Each of the opposing key-holed cross bars 108 includes keyholes 118 so that each end of each elastic cord 200 may be positioned into a keyhole 118.

Figure 37:
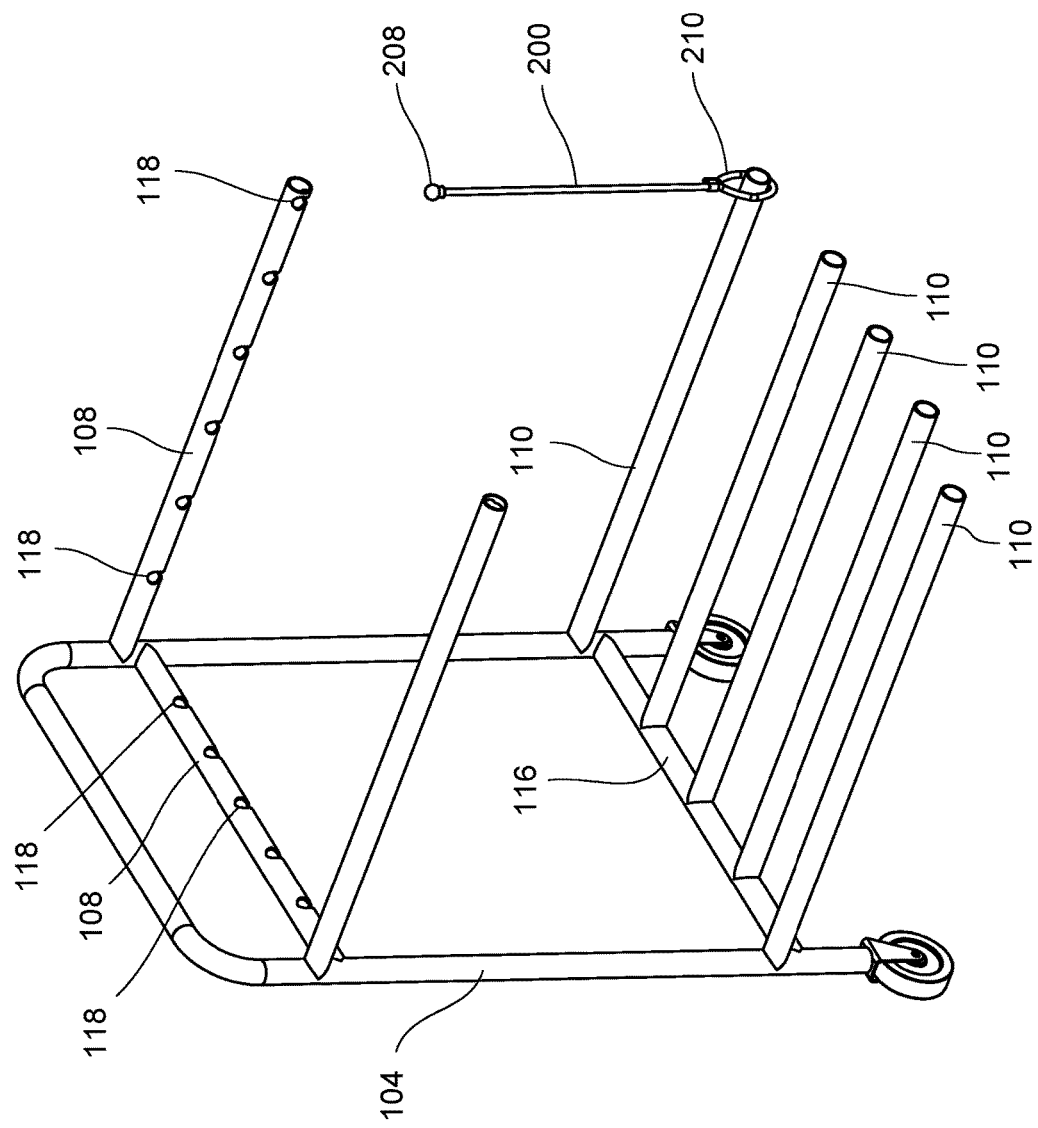
FIG. 37 is a top perspective view of another alternative embodiment of a storage device having an elastic cord with a loop fed into a cross bar.
Figure 38:
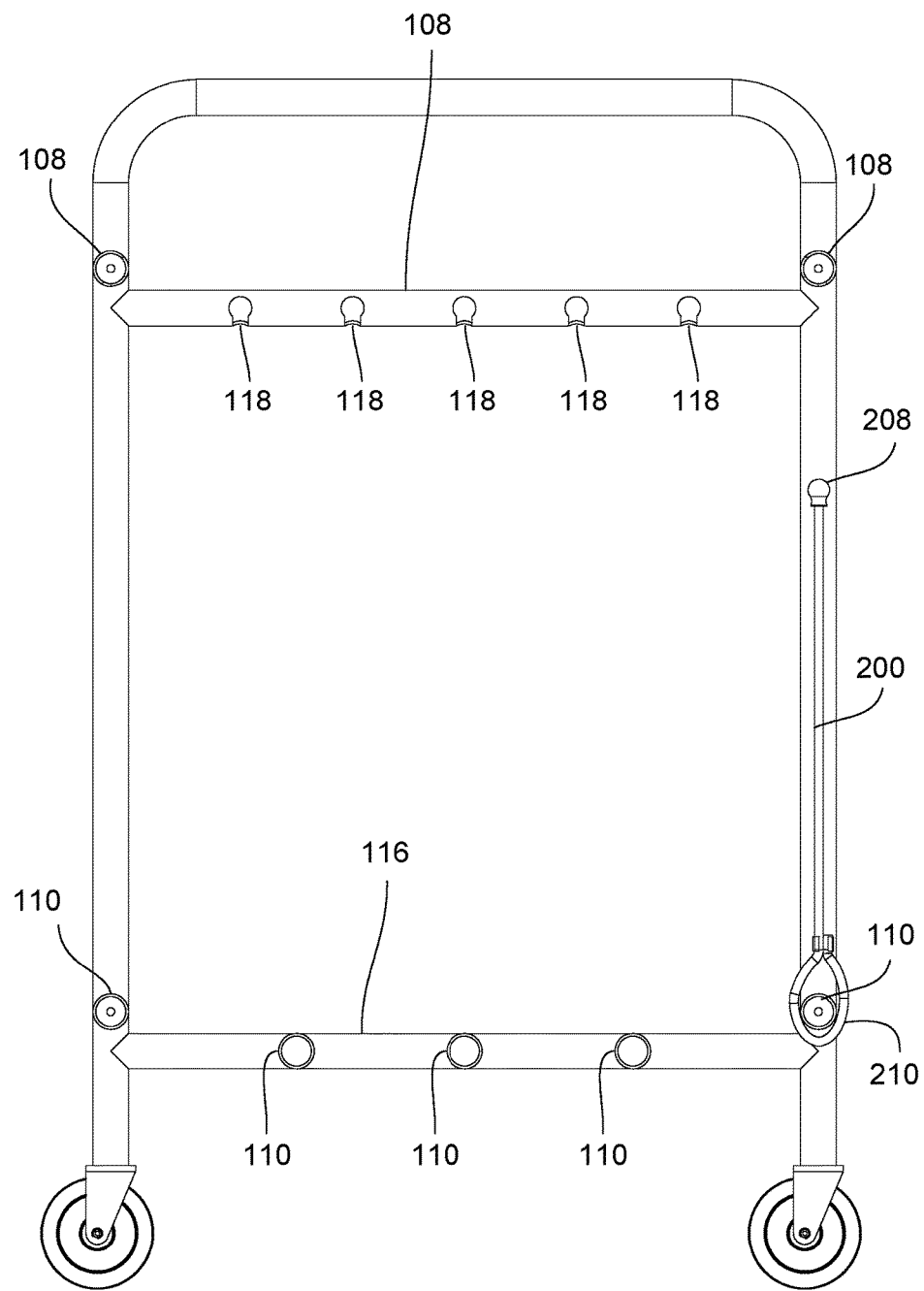
FIG. 38 is a side view of the embodiment of FIG. 37.

FIGS. 37 and 38 depict another alternative embodiment where instead of creating a knot 226 by looping the enlarged body 208 of an elastic cord 200 through the loop 210 and around a cross bar 110 (or first tubular member 404 in case of the second embodiment), the loop 210 of each elastic cord 200 is fed through the cross bar 110 (or first tubular member 404). The loop 210 can be fed into the cross bar 110 before the second side frame 106 is coupled to the frame. In this manner, a number of elastic cords 200 can be fed into the cross bar 110 before the second side frame 106 is attached. When the assembly of the frame is completed, the enlarged body 208 of each elastic cord 200 can be positioned into each key hole of the key-holed cross bar 108.

It is contemplated that the orientation of the key-holed cross bars 108, 308 with respect to the cross bars 110, 310 may be reversed (or in the case of the second embodiment, the orientation of the first and second tubular members 404, 406 may be reversed) such that the first end 204 having the loop 210 of each elastic cord 200 is coupled towards the top of each frame 102, 302, 402, and the second end 206 having the enlarged body 208 of each elastic cord 200 is coupled towards the bottom of each frame 102, 302, 402.

It is also contemplated that the elastic cords 200 may be coupled to the frames 102, 302, and 402 horizontally instead of vertically. In this case, the frames 102, 302, and 402 would include at least one set of opposing side bars or tubular members having at least one set of keyholes 118 for horizontally coupling the elastic cords 200. The cords can also be laid out in a combination of horizontal and vertical in a checkerboard arrangement. The cords can also be at angles to the frame members other than 90 degrees.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

We claim:
1. A storage device, comprising:
at least one set of first and second tubular members;
   wherein the second tubular member includes a series of keyholes, each keyhole having an enlarged opening on a first surface of the second tubular member and a channel on a second surface of the second tubular member;
a plurality of elastic cords;
   wherein each elastic cord includes a loop on a first end and an enlarged body on a second end;
   wherein the enlarged body includes a neck;
wherein the first end of each elastic cord is coupled to the first tubular member by a knot formed by the enlarged body positioned through the loop of the elastic cord, and wherein the second end of each elastic cord is coupled to the second tubular member by the enlarged body positioned in a keyhole of the second tubular member;
wherein the plurality of elastic cords form a penetrable barrier.

2. The storage device of claim 1, comprising more than one set of first and second tubular members such that the storage device comprises more than one penetrable barrier.

3. The storage device of claim 1, further comprising at least one cross bar coupled to the first tubular member at a bottom of the storage device.

4. The storage device of claim 1, wherein the neck of the enlarged body engages the channel of the keyhole.

5. The storage device of claim 1, wherein the width of the channel is about 67%-70% the width of the enlarged opening.

6. The storage device of claim 1, wherein the width of the enlarged body is about 94% to about 96% the width of the enlarged opening and about 136% to about 140% the width of the channel.

7. The storage device of claim 1, wherein the first and second tubular members are mounted to a frame.

8. The storage device of claim 7, further comprising wheels.

9. The storage device of claim 1, wherein the first and second tubular members are mounted to a wall.

10. A storage device, comprising:
at least one pair of first and second tubular members, each tubular member including a plurality of keyholes, each keyhole having an enlarged opening on a first surface of the tubular member and a channel on a second surface of the tubular member; and
a plurality of elastic cords, each elastic cord including a first enlarged body on one end, and a second enlarged body on an opposite end;
wherein the first enlarged body of each elastic cord is positioned in a keyhole in the first tubular member, and the second enlarged body of each elastic cord is positioned in a keyhole in the second tubular member; and
wherein the plurality of elastic cords form a penetrable barrier.

11. The storage device of claim 10, wherein the first and second enlarged bodies each comprise a neck for protecting an elastic body of each elastic cord.

12. A method for assembling a storage device, comprising:
- providing first and second spaced tubular members;
- securing the first and second tubular members to a frame;
- looping an elastic cord around a first tubular member by passing an enlarged body coupled to one end of the elastic cord through a loop formed on an opposite end of the elastic cord;
- inserting the enlarged body into a keyhole of the second tubular member, the keyhole having an enlarged opening on a first surface of the second tubular member and a channel on a second surface of the second tubular member; and
- repeating the previous two steps so that a plurality of elastic cords form a penetrable barrier between the first and second tubular members.

13. The method of claim 12, wherein the frame is a wall.

14. The method of claim 12, wherein the frame is part of a bin.

15. A method for assembling a storage device, comprising:
- providing first and second spaced tubular members;
- securing the first and second tubular members to a frame;
- feeding a loop formed on one end of an elastic cord onto the first tubular member;
- inserting an enlarged body formed on an opposite end of the elastic cord into a keyhole of the second tubular member, the keyhole having an enlarged opening on a first surface of the second tubular member and a channel on a second surface of the second tubular member; and
- repeating the previous two steps so that a plurality of elastic cords form a penetrable barrier between the first and second tubular members.

16. The method of claim 15, wherein the frame is a wall.

17. The method of claim 15, wherein the frame is part of a bin.

* * * * *